(12) United States Patent
Tanimoto et al.

(10) Patent No.: US 6,495,623 B1
(45) Date of Patent: Dec. 17, 2002

(54) AQUEOUS EMULSION AND DISPERSANT FOR SUSPENSION POLYMERIZATION OF VINYL COMPOUNDS

(75) Inventors: Seiji Tanimoto, Kurashiki (JP); Naokiyo Inomata, Kurashiki (JP); Naoki Fujiwara, Kurashiki (JP)

(73) Assignee: Kuraray Co., Ltd., Kurashiki (JP)

( * ) Notice: Subject to any disclaimer, the term of this patent is extended or adjusted under 35 U.S.C. 154(b) by 0 days.

(21) Appl. No.: 09/889,579

(22) PCT Filed: Nov. 27, 2000

(86) PCT No.: PCT/JP00/08337
§ 371 (c)(1),
(2), (4) Date: Jul. 31, 2001

(87) PCT Pub. No.: WO01/40372
PCT Pub. Date: Jun. 7, 2001

(30) Foreign Application Priority Data

Dec. 3, 1999 (JP) .......... 11-344462
Dec. 13, 1999 (JP) .......... 11-352678

(51) Int. Cl.$^7$ .............. C08L 13/02
(52) U.S. Cl. ......... 524/459; 524/557; 524/503; 524/803; 525/56; 525/59; 525/557
(58) Field of Search ............ 524/503, 803, 524/557, 459; 525/56, 59

(56) References Cited

U.S. PATENT DOCUMENTS 5,331,055 A * 7/1994 Fujiwara et al. ............ 525/244
5,599,870 A * 2/1997 Nakamae et al. ........... 524/503

FOREIGN PATENT DOCUMENTS

| JP | 51-115587 | 10/1976 |
| JP | 52-110797 | 9/1977 |
| JP | 3-24481 | 4/1991 |
| JP | 5-194612 | 8/1993 |
| JP | 8-81666 | 3/1996 |
| JP | 8-259609 | 10/1996 |
| JP | 8-283313 | 10/1996 |
| JP | 9-25307 | 1/1997 |
| JP | 11-279210 | 10/1999 |
| WO | WO 91/15518 | 10/1991 |

OTHER PUBLICATIONS

G. Odian, "Principles of Polymerization", Chapter 3, Sec.3–2b, p. 185, $2^{nd}$ Ed, John Wiley & Sons, 1981.*
Poval, Polymer Publishing, pp. 368–373, 1984.

* cited by examiner

*Primary Examiner*—Edward J. Cain
*Assistant Examiner*—James T. Yeh
(74) *Attorney, Agent, or Firm*—Oblon, Spivak, McClelland, Maier & Neustadt, P.C.

(57) ABSTRACT

A polyvinyl alcohol having at least 1.9 mol % of 1,2-glycol bonds is used as a dispersant for emulsion polymerization or a dispersant for suspension polymerization, and this ensures good polymerization stability even when its amount used is reduced. The aqueous emulsion comprising the polyvinyl alcohol is resistant to water and the viscosity of the aqueous emulsion depends little on ambient temperatures. The vinylic polymers obtained through suspension polymerization in the presence of the polyvinyl alcohol are yellowed little, and the waste water in the suspension polymerization pollutes little the environment.

21 Claims, No Drawings

AQUEOUS EMULSION AND DISPERSANT FOR SUSPENSION POLYMERIZATION OF VINYL COMPOUNDS

TECHNICAL FIELD

The present invention relates to an aqueous emulsion that comprises a polyvinyl alcohol having at least 1.9 mol % of 1,2-glycol bonds (this will be hereinafter referred to as the first aspect of the invention), and to a dispersant for suspension polymerization that comprises the polyvinyl alcohol (this will be hereinafter referred to as the second aspect of the invention).

According to the invention, the polyvinyl alcohol having at least 1.9 mol % of 1,2-glycol bonds is used as a dispersant for emulsion polymerization or a dispersant for suspension polymerization, and this ensures good polymerization stability even when its amount used is reduced; the aqueous emulsion comprising the polyvinyl alcohol is resistant to water and the viscosity of the aqueous emulsion depends little on ambient temperatures; the vinylic polymers obtained through suspension polymerization in the presence of the polyvinyl alcohol are yellowed little; and the waste water in the suspension polymerization pollutes little the environment.

BACKGROUND ART

<1> Background Art of the First Aspect of the Invention, Aqueous Emulsion

Heretofore, polyvinyl alcohol (hereinafter referred to as PVA) is widely used as protective colloid in emulsion polymerization of an ethylenic unsaturated monomer, especially a vinyl ester monomer such as typically vinyl acetate. Aqueous emulsions of vinyl ester polymers obtained through emulsion polymerization with PVA serving as protective colloid have many applications in various fields of adhesives for paper products, wood products, plastics, etc., binders for dip-coated paper, non-woven fabrics, etc., as well as admixtures, jointing agents, coating compositions, paper processing agents, fiber processing agents, etc.

Controlling the degree of hydrolysis of PVA therein makes it possible to change the physical properties of such aqueous emulsions, some of which will have low viscosity just like Newtonian fluid, and will be relatively highly resistant to water, while some others will have high viscosity relatively independently of ambient temperatures. Depending on such their properties, aqueous emulsions containing PVA have many applications in various fields.

However, some aqueous emulsions containing PVA have drawbacks in that they are not resistant to water and that their viscosity greatly varies depending on ambient temperatures.

PVA serving as a dispersant for emulsion polymerization is generally grouped into "completely hydrolyzed PVA" having a degree of hydrolysis of 98% or so and "partially hydrolyzed PVA" having a degree of hydrolysis of 88 mol % or sol Aqueous emulsions containing the former PVA could have relatively good water resistance but are problematic in that their viscosity greatly varies depending on ambient temperatures. On the other hand, the viscosity of aqueous emulsions containing the later PVA does not so much depend on ambient temperatures but its temperature dependency is not still negligible, and, in addition, the aqueous emulsion is are poor in their water resistance. To solve the problems with these aqueous emulsions containing PVA, using the two types of PVA as combined in aqueous emulsions, or using PVA having an intermediate degree of hydrolysis therein is tried. However, no one has heretofore succeeded in realizing aqueous, PVA-containing emulsions that satisfy the two requirements of good water resistance and temperature independence for their viscosity. In that situation, PVA with ethylene units therein has been proposed for use in aqueous emulsions (Japanese Patent Laid-Open No. 81666/1996). Containing it, aqueous emulsions having improved water resistance and low-temperature storage stability. However, their water resistance is not satisfactory as yet and their temperature independence is not also satisfactory (see Comparative Example 7 given hereinafter). Also known is using a mercapto-terminated PVA as a dispersant for emulsion polymerization, as in Comparative Example 6 given hereinafter (Japanese Patent Laid-Open No. 24481/1991). As in Comparative Example 6, however, this is not satisfactory in point of its water resistance, and its temperature dependence of the viscosity is not satisfactorily lowered.

Given that situation, the first aspect of the invention is to provide an aqueous emulsion having the advantages of improved water resistance and lowered temperature dependence of the viscosity, and to provide a method for producing such an aqueous emulsion having the advantage of good polymerization stability, especially that still having the advantage of good polymerization stability even when the amount of the dispersant added is reduced.

<2> Background Art of the First Aspect of the Invention, Dispersant for Suspension Polymerization For producing vinylic polymers such as polyvinyl chloride resins and the like on an industrial scale, for example, widely employed is a method of suspension polymerization that comprises dispersing a vinylic compound such as vinyl chloride or the like in an aqueous medium in the presence of a dispersant followed by polymerizing it in the presence of an oil-soluble initiator. In general, the factors that govern the quality of vinylic polymers produced through such suspension polymerization include the polymerization conversion, the ratio of monomer to water, the polymerization temperature, the type and the amount of the initiator, the type of the polymerization reactor, the stirring speed, and the type of the dispersant. Above all, the type of the dispersant has the most significant influence on the polymer quality.

The necessary properties of the dispersant for suspension polymerization of vinylic compounds are that <1> it is effective for narrowing as much as possible the particle size distribution of the vinylic polymer particles obtained, <2> it is effective for making the polymer particles porous in order that the polymer particles can rapidly absorb a plasticizer so as to be readily processed, that the monomer such as vinyl chloride or the like remaining in the polymer particles can be readily removed, and that the shaped articles of the polymer particles are prevented from having fish eyes and other defects therein, <3> it is effective for making the polymer particles have a large bulk density, <4> it ensures stable polymerization even when its amount added is small, and the waste water in the process of polymerization pollutes little the environment, and <5> it does not have any negative influence on the heat resistance of the vinylic polymers obtained.

Vinylic compounds such as vinyl chloride are generally polymerized in a mode of batch-system suspension polymerization. One typical process of batch-system suspension polymerization of vinylic compounds comprises feeding an aqueous medium, a dispersant, a polymerization initiator and a vinylic compound into a polymerization reactor, then optionally adding necessary additives thereto, and heating the reactor to polymerize the monomer therein. For improving the productivity in the process, the recent tendency in the art is toward shortening the time to be taken in one batch polymerization. For this, for example, a reflux condenser or the like is installed in the system of suspension polymerization of vinylic compounds to thereby increase the efficiency of removing polymerization heat from the system; or an aqueous medium having been previously heated is charged into the system to shorten the heating time in the system (hot-charge process). However, conventional dispersants for suspension polymerization of vinylic compounds foam greatly in polymerization reactors to reduce the effective reactor capacity and to lower the polymer productivity. In particular, when such a conventional dispersant is used in a polymerization reactor equipped with a reflux condenser, it interferes with temperature control in the reactor; or when it is used in the hot-charge process, the vinylic polymer particles produced could not be porous. These are fatal defects of conventional dispersants. On the other hand, if a defoaming agent is added to the polymerization system to prevent it from foaming, it presents another problem in that the heat stability of the vinylic polymer particles produced is lowered.

For dispersants for suspension polymerization of vinylic compounds, heretofore used are cellulose derivatives such as methyl cellulose and carboxymethyl cellulose, and partially hydrolyzed PVA, either singly or as combined. In *Poval* (published by the Polymer Publishing in 1984—reference (a)), described is PVA having a degree of polymerization of 2000 and a degree of hydrolysis of 80 mol %, and this serves as a dispersant for suspension polymerization of vinyl chloride. In WO 91/15518 (reference (b)), described is a dispersant for suspension polymerization of vinylic compounds, which comprises PVA having an amino group, an ammonium group, a carboxyl group or a sulfonic acid group at the terminal and having a degree of polymerization of at least 100 and a degree of hydrolysis of from 50 to 90 mol %. In Japanese Patent Laid-Open No. 25307/1997 (reference (c)), described is a dispersant for suspension polymerization of vinylic compounds, which comprises PVA having a hydroxyalkyl group. In Japanese Patent Laid-Open No. 283313/1996 (reference (d)), described is a dispersant for suspension polymerization of vinylic compounds, which is specifically defined in point of the UV absorbance of its aqueous solution and the block character of the acetic acid group remaining therein. In Japanese Patent Laid-Open No. 115587/1976 (reference (e)), described is a method of producing polyvinyl chloride resins in the presence of a partially hydrolyzed PVA. The partially hydrolyzed PVA used therein has a degree of hydrolysis of from 60 to 90 mol %, and the degree of methanol release from it at temperature of 55° C. falls between 10 and 60%. In Japanese Patent Laid-Open No. 110797/1977 (reference (f)), described is a secondary dispersant for suspension polymerization of vinyl chloride, which comprises a polyvinyl acetate having a degree of hydrolysis of from 30 to 60 mol %. However, the dispersants described in reference (a) and reference (b) do not satisfy the requirements <1> to <4> mentioned above, and, in addition, they are further defective in that they foam greatly in polymerization systems. The dispersants described in reference (c) and reference (d) are good is some degree, as they do not foam so much in polymerization systems and their plasticizer absorbability is good. However, they do not satisfy the requirements <1> and <3> to <5> mentioned above. The dispersant used in the method described in reference (e) has relatively well balanced properties in point of the requirements <1> to <3>, but does not satisfy the requirements <4> and <5>. In addition, it is defective in that it greatly foams in polymerization systems. The secondary dispersant described in reference (f) cannot stabilize the system of suspension polymerization of vinylic compounds, when used alone. In addition when it is combined with a conventional partially hydrolyzed PVA, it presents a serious problem in that the polymerization system in the reactor greatly foams.

The object of the second aspect of the invention is to provide a dispersant for suspension polymerization of vinylic compounds, of which the advantages are that it enables stable polymerization of vinylic compounds, that its amount to be used can be reduced and therefore the vinylic polymers obtained through suspension polymerization in the presence of it are yellowed little and the waste water in the polymerization system does not so much pollute the environment, that it does not foam the polymerization system in a reactor, and that it satisfies all the requirements mentioned above.

DISCLOSURE OF THE INVENTION

<1> First described is the first aspect of the invention, aqueous emulsion.

The object of the first aspect of the invention can be attained by providing an aqueous emulsion which comprises, as the dispersoid, a polymer that contains vinyl ester monomer units, and, as the dispersant, a polyvinyl alcohol that contains at least 1.9 mol % of 1,2-glycol bonds, and of which the viscosity profile is such that the ratio of $T_{0° C.}/T_{30° C.}$ is at most 5 and the ratio of $T_{60° C.}/T_{30° C.}$ is at most 1.5 with $T_{60° C.}$ indicating the viscosity of the aqueous emulsion at 60° C., $T_{30° C.}$ indicating the viscosity thereof at 30° C. and $T_{0° C.}$ indicating the viscosity thereof at 0° C.

The polyvinyl alcohol having at least 1.9 mol % of 1,2-glycol bonds and serving as the dispersant in the aqueous emulsion of the invention is not specifically defined for its production, and may be produced in any known method. For example, it may be produced by copolymerizing a vinylene carbonate with a vinyl ester to have the 1,2-glycol bond content as above; or by polymerizing a vinyl ester at a temperature higher than that for ordinary vinyl ester polymerization, for example, at a temperature falling between 75 and 200° C., under pressure. In the latter method, the polymerization temperature preferably falls between 95 and 190° C., more preferably between 100 and 180° C. Regarding the pressure for polymerization, it is important that the pressure is so controlled that the temperature of the polymerization system does not exceed the boiling point thereof. For this, preferably, the polymerization pressure is at least 0.2 MPa, more preferably at least 0.3 MPa. Its uppermost limit is preferably at most 5 MPa, more preferably at most 3 MPa. Under the condition, the monomer may be polymerized in the presence of a radical polymerization initiator in any mode of bulk polymerization, solution polymerization, suspension polymerization or emulsion polymerization, for which, however, preferred is solution polymerization, and especially preferred is solution polymerization with a solvent of methanol. The vinyl ester polymer thus produced is hydrolyzed in an ordinary manner to obtain a polyvinyl alcohol for use herein. The 1,2-glycol bond content of the polyvinyl alcohol must be at least 1.9 mol %. More preferably, it is at least 1.95 mol %, even more preferably at least 2.0 mol %, most preferably at least 2.1 mol %. If the 1,2-glycol bond content of the polyvinyl alcohol is smaller than 1.9 mol %, the aqueous emulsion containing it will be poorly resistant to water. If so, in addition, the emulsion viscosity will much depends on ambient temperatures and the polymerization stability in producing the emulsion will be poor. Preferably, the 1,2-glycol bond content of the polyvinyl alcohol is at most 4 mol %, more preferably at most 3.5 mol %, most preferably at most 3.2 mol %. The 1,2-glycol bond content of the polyvinyl alcohol can be obtained through NMR spectrometry of the polymer.

The vinyl ester monomer includes, for example, vinyl formate, vinyl acetate, vinyl propionate, vinyl butyrate, vinyl isobutyrate, vinyl pivalate, vinyl versatate, vinyl caproate, vinyl caprylate, vinyl laurate, vinyl palmitate, vinyl stearate, vinyl oleate, vinyl benzoate, etc. Especially preferred is vinyl acetate.

For the dispersant, favorable are those produced by hydrolyzing the polymers of vinyl esters mentioned above, such as vinyl acetate. Not interfering with the object and the effect of the invention, the polymers may contain any other monomer units. Additional monomers employable herein include, for example, α-olefins such as propylene, n-butene, isobutylene, etc.; acrylic acid and its salts; acrylates such as methyl acrylate, ethyl acrylate, n-propyl acrylate, iso-propyl acrylate, n-butyl acrylate, iso-butyl acrylate, t-butyl acrylate, 2-ethylhexyl acrylate, dodecyl acrylate, octadecyl acrylate, etc.; methacrylic acid and its salts; methacrylates such as methyl methacrylate, ethyl methacrylate, n-propyl methacrylate, iso-propyl methacrylate, n-butyl methacrylate, iso-butyl methacrylate, t-butyl methacrylate, 2-ethylhexyl methacrylate, dodecyl methacrylate, octadecyl methacrylate, etc.; acrylamide and its derivatives such as N-methylacrylamide, N-ethylacrylamide, N,N-dimethylacrylamide, diacetonacrylamide, acrylamidopropanesulfonic acid and its salts, acrylamidopropyldimethylamine and its salts and quaternary salts, N-methylolacrylamide and its derivatives, etc.; methacrylamide and its derivatives such as N-methylmethacrylamide, N-ethylmethacrylamide, methacrylamidopropanesulfonic acid and its salts, methacrylamidopropyldimethylamine and its salts and quaternary salts, N-methylolmethacrylamide and its derivatives, etc.; vinyl ethers such as methyl vinyl ether, ethyl vinyl ether, n-propyl vinyl ether, iso-propyl vinyl ether, n-butyl vinyl ether, iso-butyl vinyl ether, t-butyl vinyl ether, dodecyl vinyl ether, stearyl vinyl ether, etc.; nitriles such as acrylonitrile, methacrylonitrile, etc.; vinyl halides such as vinyl chloride, vinylidene chloride, vinyl fluoride, vinylidene fluoride, vinyl bromide, etc.; allyl compounds such as allyl acetate, allyl chloride, sodium allylsulfonate, etc.; unsaturated carboxylic acids such as fumaric acid, maleic acid (anhydride), itaconic acid, and their salts and esters, etc.; vinylsilyl compounds such as vinyltrimethoxysilane, etc.; isopropenyl acetate; tetrafluoroethylene; sodium vinylsulfonate; and N-vinyl compounds such as N-vinylpyrrolidone, N-vinylformamide, N-vinylacetamide, etc. Mercapto-terminated or carboxyl-terminated, modified polyvinyl alcohols that are produced by polymerizing a vinyl ester monomer such as vinyl acetate in the presence of a thiol compound such as thiolacetic acid or mercaptopropionic acid followed by hydrolyzing the resulting polymer may also be used in the invention.

The degree of hydrolysis of the polyvinyl alcohol that contains at least 1.9 mol % of 1,2-glycol bonds and serves as the dispersant in the aqueous emulsion of the invention is not specifically defined, but is generally at least 60 mol %, more preferably at least 70 mol %, even more preferably at least 75 mol %. If its degree of hydrolysis is smaller than 60 mol %, the polyvinyl alcohol will lose solubility in water intrinsic to ordinary polyvinyl alcohols. For attaining the object of the invention to obtain good aqueous emulsions, it is desirable that the degree of polymerization (in terms of the viscosity-average degree of polymerization) of the polyvinyl alcohol to be therein falls between 100 and 8000, more preferably between 300 and 3000.

The vinyl ester monomer to constitute the dispersoid in the aqueous emulsion of the invention includes, for example, vinyl formate, vinyl acetate, vinyl propionate, vinyl butyrate, vinyl isobutyrate, vinyl pivalate, vinyl versatate, vinyl caproate, vinyl caprylate, vinyl laurate, vinyl palmitate, vinyl stearate, vinyl oleate, vinyl benzoate, etc. Especially preferred is vinyl acetate.

The polymer (dispersoid) that contains vinyl ester monomer units is a vinyl ester (co)polymer, including polyvinyl esters, and copolymers of vinyl esters with comonomers capable of copolymerizing with vinyl esters. The comonomers capable of copolymerizing with vinyl esters include, for example, olefins such as ethylene, propylene, isobutylene, etc.; vinyl halides such as vinyl chloride, vinyl fluoride, vinylidene chloride, vinylidene fluoride, etc.; acrylic acid, methacrylic acid; acrylates such as methyl acrylate, ethyl acrylate, butyl acrylate, 2-ethylhexyl acrylate, dodecyl acrylate, 2-hydroxyethyl acrylate, etc.; methacrylates such as methyl methacrylate, ethyl methacrylate, butyl methacrylate, 2-ethylhexyl methacrylate, dodecyl methacrylate, 2-hydroxyethyl methacrylate, etc.; dimethylaminoethyl acrylate, dimethylaminoethyl methacrylate, and their quaternated derivatives; acrylamide monomers such as acrylamide, methacrylamide, N-methylolacrylamide, N,N-dimethylacrylamide, acrylamido-2-methylpropanesulfonic acid and its sodium and potassium salts, etc.; styrene monomers such as styrene, α-methylstyrene, p-styrenesulfonic acid and its sodium and potassium salts, etc.; other vinyl compounds such as N-vinylpyrrolidone, etc.; and dienic monomers such as butadiene, isoprene, chloroprene, etc. One or more of these comonomers are copolymerized with the vinyl ester monomer, either singly or as combined. Preferably, the amount of the comonomer such as ethylene that is copolymerized with the vinyl ester monomer is at most 50% by weight, more preferably at most 40% by weight of all the monomers to be copolymerized. Of the polymers that contain vinyl ester monomer units, most preferred are polyvinyl esters and vinyl ester-ethylene copolymers.

Regarding the viscosity profile of the aqueous emulsion of the invention, it is important that the ratio of the emulsion viscosity at 0° C., $T_{0°\ C.}$, to the emulsion viscosity at 30° C., $T_{30°\ C.}$, or that is the ratio of $T_{0°\ C.}/T_{30°\ C.}$ is at most 5. The ratio $T_{0°\ C.}/T_{30°\ C.}$ is measured according to the method mentioned hereinunder. The ratio $T_{0°\ C.}/T_{30°\ C.}$ of at most 5 means that the emulsion viscosity increase at around 0° C. is retarded, or that is, the temperature dependence of the emulsion at around 0° C. is small. More preferably, $T_{0°\ C.}/T_{30°\ C.}$ is at most 4, even more preferably at most 3.

In the invention, it is also important that the ratio of the emulsion viscosity at 60° C., $T_{60°\ C.}$, to the emulsion viscosity at 30° C., $T_{30°\ C.}$, or that is the ratio of $T_{60°\ C.}/T_{30°\ C.}$ is at most 1.5. The ratio $T_{60°\ C.}/T_{30°\ C.}$ is measured according to the method mentioned hereinunder. The viscosity of vinyl ester polymer-containing aqueous emulsions often increase at around 60° C. In the invention, however, the ratio $T_{60°\ C.}/T_{30°\ C.}$ is defined to be at most 1.5. This means that the emulsion viscosity increase at around 60° C. is retarded, or that is, the temperature dependence of the emulsion at around 60° C. is small. More preferably, $T_{60°\ C.}/T_{30°\ C.}$ is at most 1.3, even more preferably at most 1.2. To that effect, the temperature dependence of the aqueous emulsion of the invention is small both at low temperatures and at high temperatures, and the workability and the handlability of the aqueous emulsion are extremely good.

The aqueous emulsion of the invention can be obtained by polymerizing a vinyl ester monomer through emulsion polymerization in the presence of (1) a polyvinyl alcohol that contains at least 1.9 mol % of 1,2-glycol bonds and serves as a dispersant, and (2) at least one polymerization initiator selected from hydrogen peroxide, ammonium persulfate and potassium persulfate in a molar ratio to the vinyl ester monomer of from 0.001 to 0.03, in such a polymerization mode that (3) from 5 to 20% by weight of the vinyl ester monomer, based on the total amount of the monomer (that is, based on the total amount of the vinyl ester monomer to be polymerized), is fed into the reactor in the initial stage of polymerization and the polymerization initiator is fed thereinto all at a time in a molar ratio to the initial feed of the vinyl ester monomer of from 0.001 to 0.05.

To attain the object of the invention, the amount of the polyvinyl alcohol having at least 1.9 mol % of 1,2-glycol bonds to be used in the polymerization process preferably falls between 1 and 20 parts by weight relative to 100 parts by weight of the vinyl ester monomer (in case where the monomer is combined with a comonomer capable of copolymerizing with it, the total of the monomer and the comonomer), more preferably between 3 and 20 parts by weight, even more preferably between 5 and 15 parts by weight. One characteristic feature of the invention is that, even when the amount of the polyvinyl alcohol having at least 1.9 mol % of 1,2-glycol bonds used in the polymerization process is small, for example, even when the amount of the polyvinyl alcohol used therein falls between 1 and 5 parts by weight, it surely attains the object of the invention.

According to the polymerization process, obtained is the aqueous emulsion that satisfies the requirements of $T_{0° C.}/T_{30° C.}$ of at most 5 and $T_{60° C.}/T_{30° C.}$ of at most 1.5.

As is obvious from the Examples given hereinunder, another characteristic feature of the polymerization process employed in the invention is that the filtration residue after emulsion polymerization therein is small, and this means good polymerization stability in the process.

In producing the aqueous emulsion of the invention, it is important to use at least one polymerization initiator selected from hydrogen peroxide, ammonium persulfate and potassium persulfate. Of these, especially preferred is hydrogen peroxide. In the step of emulsion polymerization in the invention, it is also extremely important to define the molar ratio of the polymerization initiator to the vinyl ester monomer to fall between 0.001 and 0.03, preferably between 0.0015 and 0.025, more preferably between 0.0018 and 0.023.

As the case may be, the polymerization initiator will be combined with a reducing agent to give a redox system reagent for use in the invention. In that case, in general, hydrogen peroxide will be combined with tartaric acid, L-ascorbic acid, Rongalit or the like; and ammonium or potassium persulfate will be combined with sodium hydrogensulfite, sodium hydrogencarbonate or the like. The amount of the reducing agent is not specifically defined, but may generally fall between 0.05 and 3 equivalents, preferably between 0.1 and 2 equivalents, more preferably between 0.3 and 1.5 equivalents to the polymerization initiator to be combined therewith.

Regarding the mode of adding the polymerization initiator to the reaction system, favorably employed herein is a method of adding it thereto all at a time in the initial stage of polymerization, or that is, adding it in one shot thereto. Concretely, from 5 to 20% by weight of all the vinyl ester monomer to be polymerized is first fed into a reactor in the initial stage of polymerization, and the polymerization initiator is fed thereinto all at a time in a molar ratio to the initial feed of the vinyl ester monomer of from 0.001 to 0.05, preferably from 0.0012 to 0.045, more preferably from 0.0013 to 0.04.

One shot addition of the predetermined amount of the polymerization initiator to the reaction system in the initial stage of polymerization improves the water resistance of the aqueous emulsion produced and lowers the temperature dependence thereof, enabling stable polymerization of the monomer, and the filtration residue from the polymerized emulsion is thereby reduced.

For initial polymerization, the monomer and the polymerization initiator are added to an aqueous solution of the dispersant, and polymerized at a temperature falling between 50 and 70° C., preferably between 55 and 65° C., for a period of time falling between 5 and 60 minutes, preferably between 10 and 50 minutes. In the initial stage of polymerization, the monomer is preferably fed into the reactor all at a time.

The initial polymerization shall be terminated when the concentration of the remaining vinyl ester monomer (in terms of % by weight of the polymer produced) has reached at most 10%, preferably at most 5%, more preferably at most 1%. The initial polymerization is followed by final polymerization. Also in the stage of final polymerization, the polymerization initiator may be added to the reaction system all at a time (in a mode of one shot addition), but, as the case may be, it may be added thereto in a continuous or intermittent addition mode. The polymerization temperature in the final polymerization stage is preferably higher by from 5 to 30° C. than that in the initial polymerization stage. Concretely, it may fall between 55 and 100° C., preferably between 60 and 95° C., more preferably between 70 and 90° C.

The polymerization pressure may be atmospheric pressure both for initial polymerization and final polymerization, but, as the case may be, increased pressure will be needed. In particular, in case where copolymer emulsions of a vinyl ester with any other comonomer, for example, with ethylene are produced, the monomers must be polymerized under increased pressure.

The aqueous emulsion of the invention obtained in the manner as above has improved water resistance and is therefore favorably used for various applications that require water resistance. In addition, the viscosity of the aqueous emulsion of the invention depends little on ambient temperatures and its viscosity does not increase even when it is stored, transported or used at low or high temperatures. Therefore, the aqueous emulsion has the advantage of good processability and handlability.

The aqueous emulsion of the invention produced according to the method as above may be directly used as it is, but, if desired, it may be combined with any other known emulsions not interfering with the object and the effect of the invention.

The dispersant to be in the aqueous emulsion of the invention is the above-mentioned PVA polymer having at least 1.9 mol % of 1,2-glycol bonds. If desired, however, it may be combined with any known anionic, nonionic or cationic surfactants, and hydroxyethyl cellulose. Also not interfering with the object and the effect of the invention, it may be combined with a polyvinyl alcohol of which the 1,2-glycol bond content is smaller than 1.9 mol %.

As the aqueous emulsion is highly resistant to water and its viscosity depends little on ambient temperatures, the aqueous emulsion of the invention is favorably used in various fields of paper-processing adhesives for paper or pulp products such as paper tubes, paper bags, paper laminates, corrugated cardboard, etc.; wood-processing adhesives for flush panels, wood laminates, butt-welded wood plates, plywood products, secondary worked plywood products (for jointing them), other ordinary wood products, etc.; adhesives for plastics; binders for dip-coated paper, non-woven fabrics, etc.; as well as admixtures, jointing agents, coating compositions, paper processing agents, fiber processing agents, etc.

<2> Next described is the second aspect of the invention, dispersant for suspension polymerization.

The object of the second aspect of the invention can be attained by providing a dispersant for suspension polymerization, which comprises a PVA polymer (A) having at least 1.9 mol % of 1,2-glycol bonds.

One preferred embodiment of the second aspect of the invention is a dispersant for suspension polymerization of vinylic compounds, which comprises a PVA polymer (A) having at least 1.9 mol % of 1,2-glycol bonds and having a degree of polymerization of from 100 to 4000.

Another preferred embodiment thereof is a dispersant for suspension polymerization of vinylic compounds, which comprises a PVA polymer (A) having at least 1.9 mol % of 1,2-glycol bonds and having a degree of polymerization of from 100 to 4000 and a block character of the residual acetic acid group of from 0.35 to 0.8.

Still another preferred embodiment thereof is a dispersant for suspension polymerization of vinylic compounds, which comprises a PVA polymer (A) having at least 1.9 mol % of 1,2-glycol bonds and having a degree of polymerization of from 100 to 4000, a block character of the residual acetic acid group of from 0.35 to 0.8, and a methanol soluble content of from 0.05 to 40% by weight.

Still another preferred embodiment thereof is a dispersant for suspension polymerization of vinylic compounds, which comprises the PVA polymer (A) as above and a polyvinyl ester polymer (B) having a degree of hydrolysis of smaller than 60 mol %, in a ratio by weight of the component (A) to the component (B), (A)/(B) falling between 40/60 and 95/5.

The PVA polymer (A) having at least 1.9 mol % of 1,2-glycol bonds for use in the invention is not specifically defined for its production, and may be produced in any known method. For example, it may be produced by copolymerizing a vinylene carbonate with a vinyl ester monomer to have the 1,2-glycol bond content as above, followed by hydrolyzing the resulting copolymer; or by polymerizing a vinyl ester monomer at a temperature higher than that for ordinary vinyl ester polymerization, for example, at a temperature falling between 75 and 200° C., under pressure, followed by hydrolyzing the resulting polymer. In the latter method, the polymerization temperature preferably falls between 95 and 190° C., more preferably between 100 and 180° C.

For controlling the block character of the residual acetic acid of the PVA polymer for use in the invention to fall between 0.35 and 0.8, for example, the starting polyvinyl ester may be alcoholyzed or hydrolyzed in the presence of a known alkali or acid catalyst. In the process, the block character of the PVA polymer to be produced can be controlled by specifically selecting the type of the hydrolysis catalyst and the type of the solvent to be used. In general, acid hydrolysis gives a PVA polymer having a higher block character than alkali hydrolysis. The block character of the PVA polymer obtained through alkali hydrolysis may be further increased through heat treatment of the polymer. For the PVA polymer for use herein, most preferred is hydrolysis with a sodium hydroxide (NaOH) catalyst in a solvent of methanol, as it is simple.

For controlling the methanol soluble content of the PVA polymer for use in the invention to fall between 0.1 and 40% by weight, various methods such as those mentioned below may be employed either singly or as combined. For this, concretely mentioned are a method of washing the hydrolyzed PVA polymer with an organic solvent such as acetone, methanol, methyl acetate or the like, in which the type of the solvent to be used, the ratio of the solvent to the PVA polymer, the washing time and the washing temperature are specifically controlled so as to make the thus-washed PVA polymer have a predetermined methanol soluble content; a method of adding a PVA polymer having a low degree of polymerization and/or having a low degree of hydrolysis to the washed and/or non-washed PVA polymer; a method of adding an agent for controlling a degree of polymerization, such as acetaldehyde, butyraldehyde, trichloroethylene, perchloroethylene, mercaptans or the like, to the polymerization system that gives a non-hydrolyzed polyvinyl ester polymer, to thereby make the polymer contain an additional component having a low degree of polymerization; a method of multi-stage polymerization to give a non-hydrolyzed polyvinyl ester polymer, in which the degree of polymerization of the polymer produced in every polymerization stage is specifically controlled; and a method of producing a non-hydrolyzed polyvinyl ester polymer through polymerization, in which the polymerization conversion of the polymer produced is specifically controlled.

The vinyl ester monomers for the PVA polymer (A) for use herein may be the same as those for the dispersant in the aqueous emulsion of the first aspect of the invention mentioned hereinabove, and especially preferred is vinyl acetate.

Not interfering with the object and the effect of the invention, the PVA polymer (A) for use herein may contain any other monomer units such as those mentioned hereinabove for use in the dispersant of the aqueous emulsion of the first aspect of the invention.

For producing the vinyl ester polymers through polymerization, employable is any known mode of solution polymerization, bulk polymerization, suspension polymerization or emulsion polymerization, like for those mentioned hereinabove. Depending on the polymerization mode employed, the polymerization initiator to be used for producing the polymers may be selected from azo initiators, peroxide initiators and redox initiators.

If desired, the PVA polymer (A) for use herein may be modified by introducing thereinto an ionic group such as an ammonium group, a carboxyl group or a sulfone group to thereby increase its solubility in water, or may be modified by introducing thereinto a nonionic group or a (long-chain) alkyl group or the like. Of such modified polymers, the degree of hydrolysis shall be determined from the ratio of the vinyl alcohol group to the vinyl ester group in the polymers, and shall not include the degree of hydrolysis of the ionic group, the nonionic group or the (long-chain) alkyl group introduced into the polymers. Terminal-modified polymers obtained in a known method of polymerizing a vinyl ester monomer such as vinyl acetate in the presence of a thiol compound such as thioacetic acid or mercaptoproionic acid followed by hydrolyzing the resulting polymer are also employable herein.

The PVA polymer (A) for use in the invention has at least 1.9 mol % of 1,2-glycol bonds in the polymer chain.

Preferably, the 1,2-glycol bond content of the PVA polymer (A) is at least 1.95 mol %, more preferably at least 2.0 mol %, most preferably at least 2.1 mol %. If the 1,2-glycol bond content of the PVA polymer (A) in its polymer chain is smaller than 1.9 mol %, the PVA polymer (A) could not ensure good polymerization stability in suspension polymerization of vinylic compounds, when its amount added to the polymerization system is reduced. Therefore, the amount of the PVA polymer (A) to be added thereto must be increased. If so, in addition, the vinyl polymer obtained through suspension polymerization in the presence of the PVA polymer (A) will be readily yellowed, the residual PVA polymer (A) in the polymerization waste water will increase and pollute the environment, and the polymerization system will foam greatly. The 1,2-glycol bond content of the PVA polymer (A) in its polymer chain is preferably at most 4 mol %, more preferably at most 3.5 mol %, most preferably at most 3.2 mol %. If it oversteps 4 mol %, the productivity of the PVA polymer (A) will lower.

The viscosity-average degree of polymerization (hereinafter referred to as "degree of polymerization") of the PVA polymer (A) for use in the invention preferably falls between 100 and 4000. More preferably, its lowermost limit is at least 150, even more preferably at least 200. Its uppermost limit is more preferably at most 3500, even more preferably at most 3000. If the degree of polymerization of the PVA polymer (A) is lower than 100, the polymerization stability in suspension polymerization of vinylic compounds in the presence of the polymer will be not good; but if larger than 4000, the PVA polymer (A) will be difficult to handle and its productivity will be low.

The block character of the residual acetic acid group of the PVA polymer (A) for use in the invention preferably falls between 0.35 and 0.8, more preferably between 0.35 and 0.75, even more preferably between 0.4 and 0.7. If its block character is smaller than 0.35, the PVA polymer (A) will be ineffective for stabilizing the suspension polymerization of vinylic compounds; but if larger than 0.8, the plasticizer absorbability of the vinylic polymers produced will lower and the particle size distribution of the vinylic polymers will broaden. If so, in addition, the productivity of the PVA polymer (A) will be low. The block character of the residual acetic acid group of PVA referred to herein is an index that indicates the chain distribution condition of the residual acetic acid group of partially-hydrolyzed PVA, and a method for determining it is described in detail in Poval (published by the Polymer Publishing in 1984) and in Macromolecules, 10, 532 (1977).

The methanol soluble content of the PVA polymer (A) for use in the invention preferably falls between 0.05 and 40% by weight. Its lowermost limit is more preferably at least 0.1% by weight, even more preferably at least 0.15% by weight. Its uppermost limit is more preferably at most 37% by weight, even more preferably at most 35% by weight. If the methanol soluble content thereof is smaller than 0.05% by weight, the productivity of the PVA polymer (A) will be low; but if larger than 40% by weight, the PVA polymer (A) will be readily yellowed and it will therefore yellow the vinylic polymers to be produced in the presence of it.

The degree of hydrolysis of the PVA polymer (A) for use in the invention is not specifically defined. However, in case where the PVA polymer (A) is used herein as the primary dispersant, the degree of hydrolysis thereof is preferably at least 60 mol %. Its lowermost limit is more preferably at least 65 mol %, even more preferably at least 68 mol %. Its uppermost limit is preferably at most 98 mol %, more preferably at most 95 mol %, even more preferably at most 90 mol %. If the degree of hydrolysis of the polymer is smaller than 60 mol %, the solubility thereof in water will be low and the polymer will be difficult to handle. If so, therefore, the capability of the polymer to serve as a protective colloid will be poor. In case where it is used as the primary dispersant, the PVA polymer (A) is preferably soluble in water at 5 to 100° C., more preferably at 10 to 90° C.

In case where the PVA polymer (A) is used herein as the secondary dispersant for suspension polymeriazation, the degree of hydrolysis thereof is preferably smaller than 60 mol %. Its uppermost limit is more preferably at most 57 mol %, even more preferably at most 55 mol %. Its lowermost limit is preferably at least 20 mol %, more preferably at least 25 mol %. If the degree of hydrolysis thereof is 60 mol % or higher, the polymer will be ineffective for improving the plasticizer absorbability of the vinylic polymers produced in the presence of it. In case where the PVA polymer (A) is used as the secondary dispersant for suspension polymerization, it is desirable that this is combined with the above-mentioned PVA polymer (A) having a degree of hydrolysis of at least 60 mol % and serving as the primary dispersant. Not limited to this, however, the secondary dispersant for suspension polymerization of the PVA polymer (A) may be combined with any other ordinary PVA polymer serving as the primary dispersant.

Also preferably, the dispersant for suspension polymerization of the invention comprises the PVA polymer (A) having at least 1.9 mol % of 1,2-glycol bonds and a polyvinyl ester polymer (B) having a degree of hydrolysis of smaller than 60 mol %, in a ratio by weight of the component (A) to the component (B), (A)/(B) falling between 40/60 and 95/5. The lowermost limit of the ratio of (A)/(B) is more preferably at least 50/50, even more preferably at least 60/40; and the uppermost limit thereof is more preferably at most 90/10, even more preferably at most 80/20. In this, the polyvinyl ester polymer (B) serves as the secondary dispersant for suspension polymerization. Combining the PVA polymer (A) with the polyvinyl ester polymer (B) enables one to obtain vinylic polymers having good plasticizer absorbability.

The polyvinyl ester polymer (B) can be produced in any known method of polymerizing a vinyl ester monomer followed by hydrolyzing the resulting polymer. For this, a vinyl ester monomer may be polymerized under the same condition as that for the PVA polymer (A). For hydrolyzing the resulting polymer into the polyvinyl ester polymer (B), employable is ordinary alcoholysis or hydrolysis with a known alkali or acid catalyst. For this, most preferred is hydrolysis with an NaOH catalyst in a solvent of methanol, as it is simple.

The vinyl ester monomers for the polyvinyl ester polymer (B) may be the same as those for the PVA polymer (A) mentioned above, and especially preferred is vinyl acetate.

Not interfering with the object and the effect of the invention, the polyvinyl ester polymer (B) may contain any other monomer units such as those mentioned hereinabove for the PVA polymer (A).

For producing the vinyl ester polymer (B) through polymerization, employable is any known mode of solution polymerization, bulk polymerization, suspension polymerization or emulsion polymerization, as in the above. Depending on the polymerization mode employed, the polymerization initiator to be used for producing the polymer may be selected from azo initiators, peroxide initiators and redox initiators.

The polyvinyl ester polymer (B) for use herein is insoluble in water or dispersible in water. It may be modified by introducing thereinto an ionic group such as an ammonium group, a carboxyl group or a sulfone group to thereby make the polymer self-emulsifiable, or may be modified by introducing thereinto a nonionic group or a (long-chain) alkyl group or the like. Terminal-modified polymers obtained in a known method of polymerizing a vinyl ester monomer such as vinyl acetate in the presence of a thiol compound such as thiolacetic acid or mercaptoproionic acid followed by hydrolyzing the resulting polymer are also employable herein.

The degree of hydrolysis of the polyvinyl ester polymer (B) for use herein is smaller than 60 mol %. Its uppermost limit is more preferably at most 57 mol %, even more preferably at most 55 mol %; and its lowermost limit is preferably at least 20 mol %, more preferably at least 25 mol %. If the degree of hydrolysis of the polyvinyl ester polymer (B) is 60 mol % or more, the vinylic polymers produced could not have improved plasticizer absorbability.

In case where the PVA polymer (A) is used as the primary dispersant in the invention, the 1,2-glycol bond content of the polyvinyl ester polymer (B) to be combined with it is preferably at least 1.9 mol %, more preferably at least 2.0 mol %, most preferably at least 2.1 mol %. Also preferably, the block character of the residual acetic acid group of the polymer (B) falls between 0.35 and 0.8, more preferably between 0.35 and 0.75, even more preferably between 0.4 and 0.7. Controlling the 1,2-glycol bond content and/or the block character of the residual acetic acid group of the polymer (B) for use herein enables more stable polymerization of vinylic compounds, and more effectively prevents the polymerization system from foaming.

The ratio by weight of the PVA polymer (A) to the polyvinyl ester polymer (B) in this embodiment, (A)/(B) falls between 40/60 and 95/5, preferably between 50/50 and 90/10, more preferably between 60/40 and 80/20. If the ratio by weight of the component (A) to the component (B), (A)/(B) is larger than 95/5, the vinylic polymers produced in the presence of the combination of (A) and (B) could not have improved plasticizer absorbability; but if smaller than 40/60, the combination of (A) and (B) will lose the ability to stabilize the polymerization of vinylic compounds.

The viscosity-average degree of polymerization of the polyvinyl ester polymer (B) for use in the invention is preferably at most 1000. Its lowermost limit is preferably at least 200, more preferably at least 230. Its uppermost limit is more preferably at most 700, even more preferably at most 600. If the degree of polymerization of the polymer (B) oversteps 1000, it is often unfavorable since the solubility of the polymer (B) in water is poor and the dispersibility thereof is also poor.

Next described is the method of producing vinylic polymers through suspension polymerization of vinylic compounds in the presence of the dispersant of the invention. The temperature of the aqueous medium in the method of producing vinylic polymers is not specifically defined. Not only cold water at about 20° C. but also hot water at 90° C. or higher is favorable to the production method. In case where the polymerization is effected according to a hot-charge process, more preferably used is hot water at 40 to 95° C., even more preferably at 50 to 90° C. The hot aqueous medium may be not only pure water but also an aqueous solution containing various additives. In addition, it may be an aqueous medium containing any other organic solvent. The amount of the hot aqueous medium to be fed into the polymerization system may be such that the medium fed thereinto can sufficiently heat the polymerization system. For increasing the efficiency of heat removal from the polymerization system, favorable is a method of using a reflux condenser-equipped polymerization reactor, or a hot-charge process of using a reflux condenser-equipped polymerization reactor. The temperature for the suspension polymerization preferably falls between 30 and 80° C., more preferably between 40 and 75° C.

In the suspension polymerization of vinylic compounds, the amount of the dispersant ((A) or the total of (A) and (B)) to be used is not specifically defined. In general, however, the amount of the dispersant is preferably at most 5 parts by weight, relative to 100 parts by weight of the vinylic compound to be polymerized, more preferably at most 1 parts by weight, even more preferably at most 0.5 parts by weight, still more preferably at most 0.1 parts by weight, further more preferably at most 0.09 parts by weight. The lowermost limit of the amount of the dispersant to be used is preferably at least 0.01 parts by weight, more preferably at least 0.02 parts by weight. In the suspension polymerization of vinylic compounds in the presence of the dispersant of the invention, the ratio of the components to be fed into the reactor and the polymerization temperature may be determined in accordance with the condition generally employed in ordinary suspension polymerization of vinylic compounds such as vinyl chloride.

Using hot water in the suspension polymerization of vinylic compounds is preferred. In addition, it is also preferable to previously heat the vinylic compounds before they are fed into the polymerization reactor.

The dispersant of the invention may be combined with any of ordinary PVA, water-soluble cellulose ethers such as methyl cellulose, hydroxyethyl cellulose, hydroxypropyl cellulose, hydroxypropylmethyl cellulose, etc.; water-soluble polymers such as gelatin, etc.; oil-soluble emulsifiers such as sorbitan monolaurate, sorbitan trioleate, glycerin tristearate, ethylene oxide-propylene oxide block copolymers, etc.; water-soluble emulsifiers such as polyoxyethylene sorbitan monolaurate, polyoxyethylene glycerin oleate, sodium laurate, etc. Their amount to be added is not specifically defined, but preferably falls between 0.01 and 1.0 part by weight relative to 100 parts by weight of the vinylic compounds to be polymerized such as vinyl chloride.

If desired, any other additives may also be added to the polymerization system. The additives include, for example, agents for controlling a degree of polymerization such as acetaldehyde, butyraldehyde, trichloroethylene, perchloroethylene, mercaptans, etc.; polymerization inhibitors such as phenolic compounds, sulfur compounds, N-oxide compounds, etc.; and pH-controlling agents, scale inhibitors and crosslinking agents. Any of these additives may be optionally added to the polymerization system. If desired, two or more these additives may be combined. On the other hand, the polymerization initiator for the suspension polymerization may be any ordinary one which is soluble in vinylic compounds and is generally used for polymerization of vinylic compounds such as vinyl chloride. It includes, for example, percarbonate compounds such as diisopropyl peroxydicarbonate, di-2-ethylhexyl peroxydicarbonate, diethoxyethyl peroxydicarbonate, etc.; perester compounds such as t-butyl peroxyneodecanate, α-cumyl peroxyneodecanate, t-butyl peroxyneodecanate, etc.; peroxides such as acetylcyclohexylsulfonyl peroxide, 2,4,4-trimethylpentyl 2-peroxyphenoxyacetate, etc.; azo compounds such as 2,2'-azobisisobutyronitrile, azobis-2,4-dimethylvaleronitrile, azobis(4-methoxy-2,4- dimethylvaleronitrile), etc. These may be combined with any of potassium persulfate, ammonium persulfate and hydrogen peroxide.

The vinylic compounds capable of being polymerized through suspension polymerization in the presence of the dispersant of the invention concretely include vinyl chloride alone, and also monomer mixtures consisting essentially of vinyl chloride (that is, monomer mixtures containing at least 50% by weight of vinyl chloride). The comonomers capable of being copolymerized with vinyl chloride include vinyl esters such as vinyl acetate, vinyl propionate, etc.; (meth) acrylates such as methyl (meth)acrylate, ethyl (meth) acrylate, etc.; olefins such as ethylene, propylene, etc.; and other monomers capable of copolymerizing with vinyl chloride, such as maleic anhydride, acrylonitrile, itaconic acid, styrene, vinylidene chloride, vinyl ether, etc. In addition, the dispersant of the invention is also applicable to homopolymerization or copolymerization of vinylic compounds not containing vinyl chloride, such as those mentioned above.

BEST MODES OF CARRYING OUT THE INVENTION

<1> First described in detail is the aqueous emulsion of the first aspect of the invention, with reference to the following Examples 1 to 7 and Comparative Examples 1 to 7. In the following Examples and Comparative Examples, "parts" and "%" are all by weight unless otherwise specifically indicated. The water resistance (water resistant bonding strength) and the temperature dependence of the viscosity of the emulsions obtained were evaluated according to the methods mentioned below.
(Evaluation of Emulsions)
(1) Water Resistant Bonding Strength (to lumber)

The aqueous emulsion obtained herein is applied onto a piece of straight-grained hemlock fir lumber in an amount of 150 g/m$^2$, and this is stuck on another piece of the same lumber. The two with the emulsion therebetween are pressed under a pressure of 7 kg/m$^2$ for 16 hours. After released from the pressure, this is cured at 20° C. and 65% RH for 5 days. Next, this is immersed in cold water at 20° C. for 4 days. While still wet, the compression shear strength of the test sample is measured.
(2) Temperature Dependence $T_{0°C.}/T_{30°C.}$ and $T_{60°C.}/T_{30°C.}$ of each aqueous emulsion are measured, and these indicate the temperature dependence of the emulsion. $T_{0°C.}$ is the viscosity of the emulsion measured after conditioned at 0° C.; $T_{30°C.}$ is the viscosity of the emulsion measured after conditioned at 30° C.; and $T_{60°C.}$ is the viscosity of the emulsion measured after conditioned at 60° C. To measure the viscosity, used is a B-type viscometer (20 rpm).
(3) Polymerization Stability After having been prepared through polymerization, the aqueous emulsion is filtered through a 60-mesh stainless steel gauze filter, and the filtration residue (%, relative to the emulsion) is measured. A smaller value of the filtration residue thus obtained indicates better polymerization stability in producing the emulsion.

Production Example 1

To a 5-liter pressure reactor equipped with a stirrer, a nitrogen inlet port and an initiator inlet port, fed were 2940 g of vinyl acetate, 60 g of methanol and 0.088 g of tartaric acid. While these were bubbled with nitrogen gas introduced thereinto at room temperature, the pressure in the reactor was increased up to 2.0 MPa, then this was kept as such for 10 minutes, and thereafter the reactor was degassed. This process was repeated three times to thereby purge the system in the reactor with nitrogen. An initiator, 2,2'-azobis (cyclohexane-1-carbonitrile) (V-40) was dissolved in methanol to prepare an initiator solution having a concentration of 0.2 g/liter. This was bubbled with nitrogen gas to thereby purge it with nitrogen. Next, the polymerization reactor was heated to elevate its inner temperature up to 120° C. In this stage, the pressure in the reactor was 0.5 MPa. Next, 2.5 ml of the initiator solution was put into the reactor to start the polymerization of the monomer therein. During the polymerization, the temperature of the system was kept at 120° C., and the initiator solution of V-40 was continuously fed into the reactor at a rate of 10.0 ml/hr. During the polymerization, the pressure in the reactor was 0.5 MPa. After 3 hours, the reactor was cooled to terminate the polymerization. In this stage, the solid concentration in there action system was 24%. Next, methanol was intermittently put into the reactor at 30° C. under reduced pressure to remove the non-reacted vinyl acetate monomer. Thus was obtained a methanol solution of polyvinyl acetate (having a polymer concentration of 33%). Methanol was added to the resulting polyvinyl acetate solution so that the solution could have a polymer concentration of 25%. To 400 g of the thus-controlled polyvinyl acetate solution in methanol (this contained 100 g of polyvinyl acetate), added was 11.6 g of an alkali solution (10% NaOH solution in methanol) (this corresponds to a molar ratio (MR) of 0.025 to the vinyl acetate units in the polyvinyl acetate) at 40° C., with which the polymer was hydrolyzed. About 2 minutes after the addition of the alkali, the system gelled, and this was ground in a mill. After having been thus ground, this was left as such for 1 hour to promote the hydrolysis of the polymer. Next, 1000 g of methyl acetate was added to this to neutralize the alkali remaining therein. Using a phenolphthalein indicator, the complete neutralization of the system was confirmed. Then, this was filtered, and 1000 g of methanol was added to the resulting white solid residue, PVA, and left at room temperature for 3 hours to wash the residue PVA. The washing operation was repeated three times. Then, this was centrifuged to remove the liquid, and the resulting PVA was dried in a drier at 70° C. for 2 days to obtain a dry PVA (PVA-1). The thus-obtained PVA (PVA-1) had a degree of hydrolysis of 98 mol %. On the other hand, the polyvinyl acetate solution in methanol, from which the non-reacted vinyl acetate monomer had been removed after polymerization, was hydrolyzed with the alkali at an alkali molar ratio of 0.5, and the resulting gel was ground and left at 60° C. for 5 hours to promote the hydrolysis of the polymer. Then, this was washed with methanol in a mode of Soxhlet extraction therewith continued for 3 days, and thereafter this was dried at 80° C. under reduced pressure for 3 days to obtain a pure PVA. The mean degree of polymerization of this PVA was measured according to a known method of JIS-K6726, and was 1700. The 1,2-glycol bond content of PVA can be obtained from the NMR peak of the polymer PVA. Concretely, PVA is completely hydrolyzed to have a degree of hydrolysis of at least 99.9 mol % (the degree of hydrolysis is measured according to JIS-K6726), then fully washed with methanol, and thereafter dried at 90° C. under reduced pressure for 2 days. After having been thus purified, the pure PVA is dissolved in DMSO-D6, to which are added a few drops of trifluoroacetic acid. The resulting polymer sample is subjected to 500 MHz proton NMR (in JEOL GX-500) at 80° C. to obtain the NMR pattern of the pure PVA.

The methine-derived peak for the vinyl alcohol units in the pure PVA is assigned to a range of from 3.2 to 4.0 ppm (integrated value A), and the methine-derived peak for one 1,2-glycol bond therein is to 3.25 ppm (integrated value B). From these, the 1,2-glycol bond content of the pure PVA is obtained according to the following equation.

1,2-Glycol Bond Content (mol %)=B/A×100

The pure PVA prepared herein was subjected to 500 MHz proton NMR (in JEOL GX-500) and its 1,2-glycol bond content was obtained in the manner as above, and was 2.2 mol %.

Production Example 2

To a 5-liter pressure reactor equipped with a stirrer, a nitrogen inlet port and an initiator inlet port, fed were 2940 g of vinyl acetate, 60 g of methanol and 0.088 g of tartaric acid. While these were bubbled with nitrogen gas introduced thereinto at room temperature, the pressure in the reactor was increased up to 2.0 MPa, then this was kept as such for 10 minutes, and thereafter the reactor was degassed. This process was repeated three times to thereby purge the system in the reactor with nitrogen. An initiator, 2,2'-azobis (cyclohexane-1-carbonitrile) (V-40) was dissolved in methanol to prepare an initiator solution having a concentration of 0.2 g/liter. This was bubbled with nitrogen gas to thereby purge it with nitrogen. Next, the polymerization reactor was heated to elevate its inner temperature up to 120° C. In this stage, the pressure in the reactor was 0.5 MPa. Next, 2.5 ml of the initiator solution was put into the reactor to start the polymerization of the monomer therein. During the polymerization, the temperature of the system was kept at 120° C., and the initiator solution of V-40 was continuously fed into the reactor at a rate of 10.0 ml/hr. During the polymerization, the pressure in the reactor was 0.5 MPa. After 3 hours, the reactor was cooled to terminate the polymerization. In this stage, the solid concentration in there action system was 24%. Next, methanol was intermittently put into the reactor at 30° C. under reduced pressure to remove the non-reacted vinyl acetate monomer. Thus was obtained a methanol solution of polyvinyl acetate (having a polymer concentration of 33%). Methanol was added to the resulting polyvinyl acetate solution so that the solution could have a polymer concentration of 25%. To 400 g of the thus-controlled polyvinyl acetate solution in methanol (this contained 100 g of polyvinyl acetate), added were 2.3 g of an alkali solution (10% NaOH solution in methanol) (this corresponds to a molar ratio (MR) of 0.005 to the vinyl acetate units in the polyvinyl acetate) and 1.4 g of water at 40° C., with which the polymer was hydrolyzed. About 20 minutes after the addition of the alkali, the system gelled, and this was ground in a mill. After having been thus ground, this was left as such for 1 hour to promote the hydrolysis of the polymer. Next, 1000 g of methyl acetate was added to this to neutralize the alkali remaining therein. Using a phenolphthalein indicator, the complete neutralization of the system was confirmed. Then, this was filtered, and 1000 g of methanol was added to the resulting white solid residue, PVA, and left at room temperature for 3 hours to wash the residue PVA. The washing operation was repeated three times. Then, this was centrifuged to remove the liquid, and the resulting PVA was dried in a drier at 70° C. for 2 days to obtain a dry PVA (PVA-2). The thus-obtained PVA (PVA-2) had a degree of hydrolysis of 88 mol %. On the other hand, the polyvinyl acetate solution in methanol, from which the non-reacted vinyl acetate monomer had been removed after polymerization, was hydrolyzed with the alkali at an alkali molar ratio of 0.5, and the resulting gel was ground and left at 60° C. for 5 hours to promote the hydrolysis of the polymer. Then, this was washed with methanol in a mode of Soxhlet extraction therewith continued for 3 days, and thereafter this was dried at 80° C. under reduced pressure for 3 days to obtain a pure PVA. The mean degree of polymerization of this PVA was measured according to a known method of JIS-K6726, and was 1700. The 1,2-glycol bond content of the pure PVA was measured through 500 MHz proton NMR (in JEOL GX-500) in the manner as above, and was 2.2 mol %.

Production Example 3

To a 5-liter pressure reactor equipped with a stirrer, a nitrogen inlet port and an initiator inlet port, fed were 2850 g of vinyl acetate, 150 g of methanol and 0.086 g of tartaric acid. While these were bubbled with nitrogen gas introduced thereinto at room temperature, the pressure in the reactor was increased up to 2.0 MPa, then this was kept as such for 10 minutes, and thereafter the reactor was degassed. This process was repeated three times to thereby purge the system in the reactor with nitrogen. An initiator, 2,2'-azobis(N-butyl-2-methylpropionamide) was dissolved in methanol to prepare an initiator solution having a concentration of 0.1 g/liter. This was bubbled with nitrogen gas to thereby purge it with nitrogen. Next, the polymerization reactor was heated to elevate its inner temperature up to 150° C. In this stage, the pressure in the reactor was 1.0 MPa. Next, 15.0 ml of the initiator solution was put into the reactor to start the polymerization of the monomer therein. During the polymerization, the temperature of the system was kept at 150° C., and the initiator solution of 2,2'-azobis(N-butyl-2-methylpropionamide) was continuously fed into the reactor at a rate of 15.8 ml/hr. During the polymerization, the pressure in the reactor was 1.0 MPa. After 4 hours, the reactor was cooled to terminate the polymerization. In this stage, the solid concentration in the reaction system was 35%. Next, methanol was intermittently put into the reactor at 30° C. under reduced pressure to remove the non-reacted vinyl acetate monomer. Thus was obtained a methanol solution of polyvinyl acetate (having a polymer concentration of 33%). Methanol was added to the resulting polyvinyl acetate solution so that the solution could have a polymer concentration of 25%. To 400 g of the thus-controlled polyvinyl acetate solution in methanol (this contained 100 g of polyvinyl acetate), added was 11.6 g of an alkali solution (10% NaOH solution in methanol) (this corresponds to a molar ratio (MR) of 0.025 to the vinyl acetate units in the polyvinyl acetate) at 40° C., with which the polymer was hydrolyzed. About 3 minutes after the addition of the alkali, the system gelled, and this was ground in a mill. After having been thus ground, this was left as such for 1 hour to promote the hydrolysis of the polymer. Next, 1000 g of methyl acetate was added to this to neutralize the alkali remaining therein. Using a phenolphthalein indicator, the complete neutralization of the system was confirmed. Then, this was filtered, and 1000 g of methanol was added to the resulting white solid residue, PVA, and left at room temperature for 3 hours to wash the residue PVA. The washing operation was repeated three times. Then, this was centrifuged to remove the liquid, and the resulting PVA was dried in a drier at 70° C. for 2 days to obtain a dry PVA (PVA-3). The thus-obtained PVA (PVA-3) had a degree of hydrolysis of 98 mol %. On the other hand, the polyvinyl acetate solution in methanol, from which the non-reacted vinyl acetate monomer had been removed after polymerization, was hydrolyzed with the alkali at an alkali molar ratio of 0.5, and the resulting gel was ground and left at 60° C. for 5 hours to promote the hydrolysis of the polymer. Then, this was washed with methanol in a mode of Soxhlet extraction therewith continued for 3 days, and thereafter this was dried at 80° C. under reduced pressure for 3 days to obtain a pure PVA. The mean degree of polymerization of this PVA was measured according to a known method of JIS-K6726, and was 1000. The 1,2-glycol bond content of the pure PVA was measured through 500 MHz proton NMR (in JEOL GX-500) in the manner as above, and was 2.5 mol %.

Production Example 4

To a 5-liter pressure reactor equipped with a stirrer, a nitrogen inlet port and an initiator inlet port, fed were 2700 g of vinyl acetate, 300 g of methanol and 0.081 g of tartaric acid. While these were bubbled with nitrogen gas introduced thereinto at room temperature, the pressure in the reactor was increased up to 2.0 MPa, then this was kept as such for 10 minutes, and thereafter the reactor was degassed. This process was repeated three times to thereby purge the system in the reactor with nitrogen. An initiator, 2,2'-azobis(N-butyl-2-methylpropionamide) was dissolved in methanol to prepare an initiator solution having a concentration of 0.05 g/liter. This was bubbled with nitrogen gas to thereby purge it with nitrogen. Next, the polymerization reactor was heated to elevate its inner temperature up to 180° C. In this stage, the pressure in the reactor was 1.6 MPa. Next, 0.4 ml of the initiator solution was put into the reactor to start the polymerization of the monomer therein. During the polymerization, the temperature of the system was kept at 180° C., and the initiator solution of 2,2'-azobis(N-butyl-2-methylpropionamide) was continuously fed into the reactor at a rate of 10.6 ml/hr. During the polymerization, the pressure in the reactor was 1.6 MPa. After 4 hours, the reactor was cooled to terminate the polymerization. In this stage, the solid concentration in the reaction system was 27%. Next, methanol was intermittently put into the reactor at 30° C. under reduced pressure to remove the non-reacted vinyl acetate monomer. Thus was obtained a methanol solution of polyvinyl acetate (having a polymer concentration of 33%). Methanol was added to the resulting polyvinyl acetate solution so that the solution could have a polymer concentration of 30%. To 333 g of the thus-controlled polyvinyl acetate solution in methanol (this contained 100 g of polyvinyl acetate), added was 11.6 g of an alkali solution (10% NaOH solution in methanol) (this corresponds to a molar ratio (MR) of 0.025 to the vinyl acetate units in the polyvinyl acetate) at 40° C., with which the polymer was hydrolyzed. About 3 minutes after the addition of the alkali, the system gelled, and this was ground in a mill. After having been thus ground, this was left as such for 1 hour to promote the hydrolysis of the polymer. Next, 1000 g of methyl acetate was added to this to neutralize the alkali remaining therein. Using a phenolphthalein indicator, the complete neutralization of the system was confirmed. Then, this was filtered, and 1000 g of methanol was added to the resulting white solid residue, PVA, and left at room temperature for 3 hours to wash the residue PVA. The washing operation was repeated three times. Then, this was centrifuged to remove the liquid, and the resulting PVA was dried in a drier at 70° C. for 2 days to obtain a dry PVA (PVA-4). The thus-obtained PVA (PVA-4) had a degree of hydrolysis of 98 mol %. On the other hand, the polyvinyl acetate solution in methanol, from which the non-reacted vinyl acetate monomer had been removed after polymerization, was hydrolyzed with the alkali at an alkali molar ratio of 0.5, and the resulting gel was ground and left at 60° C. for 5 hours to promote the hydrolysis of the polymer. Then, this was washed with methanol in a mode of Soxhlet extraction therewith continued for 3 days, and thereafter this was dried at 80° C. under reduced pressure for 3 days to obtain a pure PVA. The mean degree of polymerization of this PVA was measured according to a known method of JIS-K6726, and was 500. The 1,2-glycol bond content of the pure PVA was measured through 500 MHz proton NMR (in JEOL GX-500) in the manner as above, and was 2.9 mol %.

Production Example 5

To a 5-liter pressure reactor equipped with a stirrer, a nitrogen inlet port and an initiator inlet port, fed were 2400 g of vinyl acetate, 600 g of methanol and 49.3 g of vinylene carbonate. While these were bubbled with nitrogen gas introduced thereinto at room temperature, the pressure in the reactor was increased up to 2.0 MPa, then this was kept as such for 10 minutes, and thereafter the reactor was degassed. This process was repeated three times to thereby purge the system in the reactor with nitrogen. An initiator, $\alpha,\alpha'$-azobisisobutyronitrile was dissolved in methanol to prepare an initiator solution having a concentration of 1.0 g/liter. This was bubbled with nitrogen gas to thereby purge it with nitrogen. Next, the polymerization reactor was heated to elevate its inner temperature up to 90° C. In this stage, the pressure in the reactor was 0.4 MPa. Next, 3.0 ml of the initiator solution was put into the reactor to start the polymerization of the monomers therein. During the polymerization, the temperature of the system was kept at 90° C., and the initiator solution of $\alpha,\alpha'$-azobisisobutyronitrile was continuously fed into the reactor at a rate of 4.9 ml/hr. During the polymerization, the pressure in the reactor was 0.4 MPa. After 4 hours, the reactor was cooled to terminate the polymerization. In this stage, the solid concentration in the reaction system was 38%. Next, methanol was intermittently put into the reactor at 30° C. under reduced pressure to remove the non-reacted vinyl acetate monomer. Thus was obtained a methanol solution of polyvinyl acetate (having a polymer concentration of 33%). Methanol was added to the resulting polyvinyl acetate solution so that the solution could have a polymer concentration of 25%. To 400 g of the thus-controlled polyvinyl acetate solution in methanol (this contained 100 g of polyvinyl acetate), added was 46.4 g of an alkali solution (10% NaOH solution in methanol) (this corresponds to a molar ratio (MR) of 0.10 to the vinyl acetate units in the polyvinyl acetate) at 40° C., with which the polymer was hydrolyzed. About 1 minute after the addition of the alkali, the system gelled, and this was ground in a mill. After having been thus ground, this was left as such for 1 hour to promote the hydrolysis of the polymer. Next, 1000 g of methyl acetate was added to this to neutralize the alkali remaining therein. Using a phenolphthalein indicator, the complete neutralization of the system was confirmed. Then, this was filtered, and 1000 g of methanol was added to the resulting white solid residue, PVA, and left at room temperature for 3 hours to wash the residue PVA. The washing operation was repeated three times. Then, this was centrifuged to remove the liquid, and the resulting PVA was dried in a drier at 70° C. for 2 days to obtain a dry PVA (PVA-5).

The thus-obtained PVA (PVA-5) had a degree of hydrolysis of 99.5 mol %.

On the other hand, the polyvinyl acetate solution in methanol, from which the non-reacted vinyl acetate monomer had been removed after polymerization, was hydrolyzed with the alkali at an alkali molar ratio of 0.5, and the resulting gel was ground and left at 60° C. for 5 hours to promote the hydrolysis of the polymer. Then, this was washed with methanol in a mode of Soxhlet extraction therewith continued for 3 days, and thereafter this was dried at 80° C. under reduced pressure for 3 days to obtain a pure PVA. The degree of polymerization of this PVA was measured according to a known method of JIS-K6726, and was 1200. The 1,2-glycol bond content of the pure PVA was measured through 500 MHz proton NMR (in JEOL GX-500) in the manner as above, and was 2.5 mol %.

Production Example 6

To a 5-liter four-neck separable flask equipped with a stirrer, a nitrogen inlet port, an initiator inlet port and a reflux condenser, fed were 2000 g of vinyl acetate, 400 g of methanol and 78.8 g of vinylene carbonate. These were bubbled with nitrogen introduced thereinto at room temperature for 30 minutes to thereby purge the system in the flask with nitrogen. The inner temperature in the flask was controlled at 60° C., and then 0.9 g of an initiator, α,α'-azobisisobutyronitrile was put into the flask to start the polymerization of the monomers therein. During the polymerization, the temperature of the system was kept at 60° C. After 4 hours, the flask was cooled to terminate the polymerization. In this stage, the solid concentration in the reaction system was 55%. Next, methanol was intermittently put into the flask at 30° C. under reduced pressure to remove the non-reacted vinyl acetate monomer. Thus was obtained a methanol solution of polyvinyl acetate (having a polymer concentration of 33%). Methanol was added to the resulting polyvinyl acetate solution so that the solution could have a polymer concentration of 25%. To 400 g of the thus-controlled polyvinyl acetate solution in methanol (this contained 100 g of polyvinyl acetate), added was 46.4 g of an alkali solution (10% NaOH solution in methanol) (this corresponds to a molar ratio (MR) of 0.10 to the vinyl acetate units in the polyvinyl acetate) at 40° C., with which the polymer was hydrolyzed. About 1 minute after the addition of the alkali, the system gelled, and this was ground in a mill. After having been thus ground, this was left as such for 1 hour to promote the hydrolysis of the polymer. Next, 1000 g of methyl acetate was added to this to neutralize the alkali remaining therein. Using a phenolphthalein indicator, the complete neutralization of the system was confirmed. Then, this was filtered, and 1000 g of methanol was added to the resulting white solid residue, PVA, and left at room temperature for 3 hours to wash the residue PVA. The washing operation was repeated three times. Then, this was centrifuged to remove the liquid, and the resulting PVA was dried in a drier at 70° C. for 2 days to obtain a dry PVA (PVA-6).

The thus-obtained PVA (PVA-6) had a degree of hydrolysis of 99.5 mol %. On the other hand, the polyvinyl acetate solution in methanol, from which the non-reacted vinyl acetate monomer had been removed after polymerization, was hydrolyzed with the alkali at an alkali molar ratio of 0.5, and the resulting gel was ground and left at 60° C. for 5 hours to promote the hydrolysis of the polymer. Then, this was washed with methanol in a mode of Soxhlet extraction therewith continued for 3 days, and thereafter this was dried at 80° C. under reduced pressure for 3 days to obtain a pure PVA. The degree of polymerization of this PVA was measured according to a known method of JIS-K6726, and was 1700. The 1,2-glycol bond content of the pure PVA was measured through 500 MHz proton NMR (in JEOL GX-500) in the manner as above, and was 3.0 mol %.

Production Example 7

2400 g of vinyl acetate, 580 g of methanol and 0.93 g of thiolacetic acid were put into a reactor, and fully purged with nitrogen, and thereafter the outer temperature of the reactor was elevated up to 65° C. After the inner temperature thereof reached 60° C., 20 g of methanol containing 0.868 g of 2,2-azobisisobutyronitrile was put into the reactor. Immediately after this, 60 g of a methanol solution containing 17.4 g of thioacetic acid was put thereinto at a constant rate over a period of 5 hours. After 5 hours, the polymerization conversion of the monomer reached 50.4%. After 5 hours, the reactor was cooled, and the remaining vinyl acetate (VAc) was expelled from the system under reduced pressure along with methanol, with methanol being introduced thereinto. Thus was obtained a methanol solution of polyvinyl acetate (having a polymer concentration of 54.5%). A part of the polymer solution in methanol was sampled, to which was added a methanol solution of NaOH at a ratio, [NaOH]/[VAc] in 50% polyvinyl acetate, of 0.05 by mol, and the polymer was hydrolyzed at 40° C. About 1 minute after the addition of the alkali, the system gelled, and this was ground in a mill. After having been thus ground, this was left as such for 1 hour to promote the hydrolysis of the polymer. Next, 1000 g of methyl acetate was added to this to neutralize the alkali remaining therein. Using a phenolphthalein indicator, the complete neutralization of the system was confirmed. Then, this was filtered, and 1000 g of methanol was added to the resulting white solid residue, PVA, and left at room temperature for 3 hours to wash the residue PVA. The washing operation was repeated three times. Then, this was centrifuged to remove the liquid, and the resulting PVA was dried in a drier at 70° C. for 2 days to obtain a dry PVA (PVA-11).

The thus-obtained PVA (PVA-11) had a degree of hydrolysis of 98.6 mol %.

On the other hand, the polyvinyl acetate solution in methanol, from which the non-reacted vinyl acetate monomer had been removed after polymerization, was hydrolyzed with the alkali at an alkali molar ratio of 0.5, and the resulting gel was ground and left at 60° C. for 5 hours to promote the hydrolysis of the polymer. Then, this was washed with methanol in a mode of Soxhlet extraction therewith continued for 3 days, and thereafter this was dried at 80° C. under reduced pressure for 3 days to obtain a pure PVA. The degree of polymerization of this PVA was measured according to a known method of JIS-K6726, and was 130. The 1,2-glycol bond content of the pure PVA was measured through 500 MHz proton NMR (in JEOL GX-500) in the manner as above, and was 1.6 mol %.

EXAMPLE 1

300 g of ion-exchanged water and 26 g of PVA-1 obtained in Production Example 1 (having a degree of polymerization of 1700, a degree of hydrolysis of 98.0 mol %, and a 1,2-glycol content of 2.2 mol %) were put into a one-liter polymerization reactor of glass equipped with a reflux condenser, a dropping funnel, a thermometer and a nitrogen inlet port, and completely dissolved at 95° C. Next, the resulting aqueous PVA solution was cooled, purged with nitrogen, and then heated up to 60° C. with stirring at 200 rpm. Next, 4.4 g of an aqueous 10% solution of tartaric acid and 3 g of aqueous 5% hydrogen peroxide were added thereto in one shot, and then 26 g of vinyl acetate was added thereto to start its polymerization. 30 minutes after its start, the initial-stage polymerization was finished (in this stage, the amount of the remaining monomer, vinyl acetate was smaller than 1% by weight). Next, 0.9 g of an aqueous 10% solution of tartaric acid and 3 g of aqueous 5% hydrogen peroxide were added to the system also in one shot, and then 234 g of vinyl acetate was continuously added thereto over a period of 2 hours to complete its polymerization. The polymerization temperature was kept at 80° C. After cooled, this was filtered through a 60-mesh stainless steel gauze filter. Through the process, obtained was a polyvinyl acetate emulsion (Em-i) having a solid content of 47.3%. This was evaluated according to the methods mentioned above. Its data are given in Tables 1 and 2.

Comparative Example 1

A polyvinyl acetate emulsion (Em-2) having a solid content of 47.1% was produced in the same manner as in Example 1, for which, however, used was PVA-7 produced in a conventional manner (having a degree of polymerization of 1700, a degree of hydrolysis of 98.0 mol % and a 1,2-glycol content of 1.6 mol %; Kuraray's PVA-117) and not PVA-1. This emulsion was evaluated according to the methods mentioned above. Its data are given in Tables 1 and 2.

EXAMPLE 2

300 g of ion-exchanged water and 13 g of PVA-2 obtained in Production Example 2 (having a degree of polymerization of 1700, a degree of hydrolysis of 88.0 mol %, and a 1,2-glycol content of 2.2 mol %) were put into a one-liter polymerization reactor of glass equipped with a reflux condenser, a dropping funnel, a thermometer and a nitrogen inlet port, and completely dissolved at 95° C. Next, the resulting aqueous PVA solution was cooled, purged with nitrogen, and then heated up to 60° C. with stirring at 200 rpm. Next, 18 g of an aqueous 10% solution of tartaric acid and 26 g of vinyl acetate were added thereto, and 85 g of aqueous 1% hydrogen peroxide was continuously added thereto over a period of 2.5 hours to start the polymerization of the monomer. 30 minutes after its start, the initial-stage polymerization was finished (in this stage, the amount of the remaining monomer, vinyl acetate was smaller than 1% by weight). Next, 234 g of vinyl acetate was continuously added thereto over a period of 2 hours. After the addition of vinyl acetate thereto, 4.8 g of aqueous 1% hydrogen peroxide were added to the system in one shot to complete the polymerization of the monomer. The polymerization temperature was kept at 80° C. After cooled, this was filtered through a 60-mesh stainless steel gauze filter. Based on the filtration residue having remained on the filter, the polymerization stability of the system was evaluated in the same manner as in Example 1. Through the process, obtained was a polyvinyl acetate emulsion (Em-3) having a solid content of 47.6%. This emulsion was evaluated according to the methods mentioned above. Its data are given in Tables 1 and 2.

Comparative Example 2

A polyvinyl acetate emulsion (Em-4) having a solid content of 47.4% was produced in the same manner as in Example 2, for which, however, used was PVA-8 produced in a conventional manner (having a degree of polymerization of 1700, a degree of hydrolysis of 88.0 mol % and a 1,2-glycol content of 1.6 mol %; Kuraray's PVA-217) and not PVA-2. This emulsion was evaluated according to the methods mentioned above. Its data are given in Tables 1 and 2.

EXAMPLE 3

300 g of ion-exchanged water and 7.8 g of PVA-3 obtained in Production Example 3 (having a degree of polymerization of 1000, a degree of hydrolysis of 98.0 mol %, and a 1,2-glycol content of 2.5 mol %) were put into a one-liter polymerization reactor of glass equipped with a reflux condenser, a dropping funnel, a thermometer and a nitrogen inlet port, and completely dissolved at 95° C. Next, the resulting aqueous PVA solution was cooled, purged with nitrogen, and then heated up to 60° C. with stirring at 200 rpm. Next, 4.4 g of an aqueous 10% solution of tartaric acid and 3 g of aqueous 5% hydrogen peroxide were added thereto in one shot, and then 26 g of vinyl acetate was added thereto to start its polymerization. 30 minutes after its start, the initial-stage polymerization was finished (in this stage, the amount of the remaining monomer, vinyl acetate was smaller than 1% by weight). Next, 0.9 g of an aqueous 10% solution of tartaric acid and 3 g of aqueous 5% hydrogen peroxide were added to the system also in one shot, and then 234 g of vinyl acetate was continuously added thereto over a period of 2 hours to complete its polymerization. The polymerization temperature was kept at 80° C. After cooled, this was filtered through a 60-mesh stainless steel gauze filter. Through the process, obtained was a polyvinyl acetate emulsion (Em-5) having a solid content of 47.7%. This emulsion was evaluated according to the methods mentioned above. Its data are given in Tables 1 and 2.

Comparative Example 3

Emulsion polymerization was tried in the same manner as in Example 3, for which, however, used was PVA-9 produced in a conventional manner (having a degree of polymerization of 1000, a degree of hydrolysis of 98.5 mol % and a 1,2-glycol content of 1.6 mol %; Kuraray's PVA-110) and not PVA-3. In this, however, the polymerization was blocked on its way, and did not give a stable emulsion.

EXAMPLE 4

A polyvinyl acetate emulsion (Em-7) having a solid content of 47.8% was produced in the same manner as in Example 1, for which, however, used was PVA-4 produced in Production Example 4 (having a degree of polymerization of 500, a degree of hydrolysis of 98 mol % and a 1,2-glycol content of 2.9 mol %) and not PVA-1. This emulsion was evaluated according to the methods mentioned above. Its data are given in Tables 1 and 2.

Comparative Example 4

Emulsion polymerization was tried in the same manner as in Example 1, for which, however, used was PVA-10 produced in a conventional manner (having a degree of polymerization of 420, a degree of hydrolysis of 98 mol % and a 1,2-glycol content of 1.6 mol %) and not PVA-1. In this, however, the polymerization was blocked on its way, and did not give a stable emulsion.

EXAMPLE 5

A polyvinyl acetate emulsion (Em-8) having a solid content of 47.8% was produced in the same manner as in Example 1, for which, however, used was PVA-5 produced in Production Example 5 (having a degree of polymerization of 1200, a degree of hydrolysis of 99.5 mol % and a 1,2-glycol content of 2.5 mol %) and not PVA-1. This emulsion was evaluated according to the methods mentioned above. Its data are given in Tables 1 and 2.

EXAMPLE 6

A polyvinyl acetate emulsion (Em-9) having a solid content of 47.8% was produced in the same manner as in Example 1, for which, however, used was PVA-6 produced in Production Example 6 (having a degree of polymerization of 1700, a degree of hydrolysis of 99.5 mol % and a 1,2-glycol content of 3.0 mol %) and not PVA-1. This emulsion was evaluated according to the methods mentioned above. Its data are given in Tables 1 and 2.

EXAMPLE 7

100 g of an aqueous 7.5% solution of PVA-1 was put into a pressure autoclave equipped with a nitrogen inlet port, a thermometer and a stirrer. After heated up to 60° C., this was purged with nitrogen. Next, 8 g of vinyl acetate was added to the system, then ethylene was introduced thereinto to have an increased pressure of 45 kg/cm$^2$, and 0.9 g of aqueous 2.5% hydrogen peroxide and 1.35 g of an aqueous 2% solution of Rongalit were added thereto under pressure to start the polymerization of the monomers. 30 minutes after its start, the initial-stage polymerization was finished (in this stage, the amount of the remaining monomer, vinyl acetate was smaller than 1% by weight). Next, this was heated up to 80° C., and 72 g of vinyl acetate, 4.5 g of aqueous 1% hydrogen peroxide and 1.35 g of an aqueous 2% solution of Rongalit were added thereto under pressure over a period of 2 hours to complete the polymerization of the monomers. The polymerization temperature was kept at 80° C. After cooled, this was filtered in the same manner as in Example 1. Through the process, obtained was an ethylene-vinyl acetate copolymer emulsion (Em-10) having a solid content of 50.1% and an ethylene content of 15% by weight. This was evaluated according to the methods mentioned above. Its data are given in Table 1.

Comparative Example 5

An ethylene-vinyl acetate copolymer emulsion (Em-11) having a solid content of 49.5% and an ethylene content of 10% by weight was produced in the same manner as in Example 7, for which, however, used was PVA-7 and not PVA-1. This was evaluated according to the methods mentioned above. Its data are given in Tables 1 and 2.

Comparative Example 6

A polyvinyl acetate emulsion (Em-12) having a solid content of 47.1% was produced in the same manner as in Example 1, for which, however, used was PVA-11 (having a degree of polymerization of 130, a degree of hydrolysis of 98.6 mol % and a 1,2-glycol content of 1.6 mol %, and terminated by a mercapto group) and not PVA-1. This emulsion was evaluated according to the methods mentioned above. Its data are given in Tables 1 and 2.

Comparative Example 7

1400 g of ion-exchanged water and 225 g of ethylene-modified PVA (having a degree of polymerization of 1400, a degree of hydrolysis of 98.0 mol %, an ethylene content of 5.5 mol % and a 1,2-glycol bond content of 1.6 mol %) (PVA-12) were put into a 5-liter reactor of glass equipped with a stirrer, reflux condenser, a dropping funnel, a thermometer and a nitrogen inlet port, and completely dissolved at 95° C. Next, the aqueous, modified PVA solution was cooled, and controlled to have a pH of 4. 0.05 g of ferrous chloride was added to this, which was then purged with nitrogen. Next, 350 g of vinyl acetate was added to this with stirring at 140 rpm, and then heated up to 60° C. With continuously introducing aqueous 0.7% hydrogen peroxide thereinto at a rate of 15 ml/hr and an aqueous 6% solution of Rongalit at a rate of 10 ml/hr, the monomer was polymerized at 70° C. 30 minutes after its start, the initial-stage polymerization was finished (in this stage, the amount of the remaining monomer, vinyl acetate was smaller than 1% by weight). Next, 1400 g of vinyl acetate was continuously added to the system over a period of 3 hours. After the addition, the system was kept at 80° C. for 1 hour to complete the polymerization of the monomer. Through the process, obtained was an aqueous polyvinyl acetate emulsion (Em-13) having a solid content of 50.4%.

TABLE 1

Polymerization Condition for Emulsion

| | Amount of PVA used (relative to 100 parts by weight of total monomer) | Polymerization Initiator | Molar Ratio (/total monomer) | Initial Molar Ratio (/initial monomer) | Amount of Monomer fed in the initial-stage polymerization (wt. %) (/total monomer) |
|---|---|---|---|---|---|
| Example 1 | 10 | hydrogen peroxide | 0.0029 | 0.013 | 10 |
| Comparative Example 1 | 10 | hydrogen peroxide | 0.0029 | 0.013 | 10 |
| Example 2 | 5 | hydrogen peroxide | 0.0087 | 0.017 | 10 |
| Comparative Example 2 | 5 | hydrogen peroxide | 0.0087 | 0.017 | 10 |
| Example 3 | 3 | hydrogen peroxide | 0.0029 | 0.013 | 10 |
| Comparative Example 3 | 3 | hydrogen peroxide | 0.0029 | 0.013 | 10 |
| Example 4 | 10 | hydrogen peroxide | 0.0029 | 0.013 | 10 |
| Comparative Example 4 | 10 | hydrogen peroxide | 0.0029 | 0.013 | 10 |
| Example 5 | 10 | hydrogen peroxide | 0.0029 | 0.013 | 10 |
| Example 6 | 10 | hydrogen peroxide | 0.0029 | 0.013 | 10 |
| Example 7 | 8.2 | hydrogen peroxide | 0.0021 | 0.0071 | 10 |
| Comparative Example 5 | 8.5 | hydrogen peroxide | 0.0021 | 0.0071 | 10 |
| Comparative Example 6 | 10 | hydrogen peroxide | 0.0029 | 0.013 | 10 |
| Comparative Example 7 | 12.9 | hydrogen peroxide | 0.0007 | 0.0004 | 10 |

TABLE 2

| | PVA | Emulsion | Polymerization Stability (filtration residue, wt. %) | Water resistance Bonding Strength to lumber (kg/cm$^2$) | Temperature Dependence $T_{0° C.}/T_{30° C.}$ | $T_{60° C.}/T_{30° C.}$ |
|---|---|---|---|---|---|---|
| Example 1 | PVA-1 | Em-1 | 0.005 | 12 | 3.5 | 0.9 |
| Comp. Example 1 | PVA-7 | Em-2 | 0.05 | 9 | 8.8 | 0.9 |
| Example 2 | PVA-2 | Em-3 | 0.001 | 7 | 1.3 | 0.9 |
| Comp. Example 2 | PVA-8 | Em-4 | 0.006 | 0 | 1.8 | 0.8 |
| Example 3 | PVA-3 | Em-5 | 0.005 | 10 | 2.4 | 1.0 |
| Comp. Example 3 | PVA-9 | The polymerization was blocked on its way, and did not give a stable emulsion. | | | | |
| Example 4 | PVA-4 | Em-7 | 0.004 | 5 | 1.2 | 0.8 |

TABLE 2-continued

| | PVA | Emulsion | Polymerization Stability (filtration residue, wt. %) | Water resistance Bonding Strength to lumber (kg/cm$^2$) | Temperature Dependence $T_{0°C.}/T_{30°C.}$ | $T_{60°C.}/T_{30°C.}$ |
|---|---|---|---|---|---|---|
| Comp. Example 4 | PVA-10 | \multicolumn{5}{l}{The polymerization was blocked on its way, and did not give a stable emulsion.} | |
| Example 5 | PVA-5 | Em-8 | 0.006 | 11 | 4.3 | 1.0 |
| Example 6 | PVA-6 | Em-9 | 0.005 | 12 | 3.9 | 0.9 |
| Example 7 | PVA-1 | Em-10 | 0.002 | 15 | 3.2 | 1.0 |
| Comp. Example 5 | PVA-7 | Em-11 | 0.005 | 8 | 7.6 | 1.0 |
| Comp. Example 6 | PVA-11 | Em-12 | 0.03 | 9 | 6.9 | 1.0 |
| Comp. Example 7 | PVA-12 | Em-13 | 0.003 | 8 | 4.8 | 2.0 |

PVA-1: having a degree of polymerization of 1700, a degree of hydrolysis of 98.0 mol %, and a 1,2-glycol bond content of 2.2 mol %.

PVA-2: having a degree of polymerization of 1700, a degree of hydrolysis of 88.0 mol %, and a 1,2-glycol bond content of 2.2 mol %.

PVA-3: having a degree of polymerization of 1000, a degree of hydrolysis of 98.0 mol %, and a 1,2-glycol bond content of 2.5 mol %.

PVA-4: having a degree of polymerization of 500, a degree of hydrolysis of 98 mol %, and a 1,2-glycol bond content of 2.9 mol %.

PVA-5: having a degree of polymerization of 1200. a degree of hydrolysis of 99.5 mol %, and a 1,2-glycol bond content of 2.5 mol %.

PVA-6: having a degree of polymerization of 1700, a degree of hydrolysis of 99.5 mol %, and a 1,2-glycol bond content of 3.0 mol %.

PVA-7: having a degree of polymerization of 1700, a degree of hydrolysis of 98.0 mol %, and a 1,2-glycol bond content of 1.6 mol % (Kuraray's PVA-117).

PVA-8: having a degree of polymerization of 1700, a degree of hydrolysis of 88.0 mol %, and a 1,2-glycol bond content of 1.6 mol % (Kuraray's PVA-217).

PVA-9: having a degree of polymerization of 1000, a degree of hydrolysis of 98.5 mol %, and a 1,2-glycol bond content of 1.6 mol % (Kuraray's PVA-110).

PVA-10: having a degree of polymerization of 420, a degree of hydrolysis of 98 mol %, and a 1,2-glycol bond content of 1.6 mol % (known PVA).

PVA-11: having a degree of polymerization of 130, a degree of hydrolysis of 98.6 mol %, and a 1,2-glycol bond content of 1.6 mol %, and terminated by a mercapto group.

PVA-12: having a degree of polymerization of 1400, a degree of hydrolysis of 98 mol %, a 1,2-glycol bond content of 1.6 mol %, and an ethylene content of 5.5 mol %.

The aqueous emulsion of the first aspect of the invention mentioned above is highly resistant to water and depends little on ambient temperatures. The method of producing it enjoys good polymerization stability. The emulsion is favorably used in various fields of adhesives for paper products, wood products, plastics, etc., binders for dip-coated paper, non-woven fabrics, etc., and admixtures, jointing agents, coating compositions, paper processing agents, fiber processing agents, etc.

<2> Next described in detail is the dispersant for suspension polymerization of the second aspect of the invention, with reference to the following Examples 2-1 to 2-15 and Comparative Example 2-1~2-7.

The PVA polymer (A) will be referred to as "PA", and the polyvinyl ester polymer (B) as "PB".

[Analysis of PVA Polymer (A) and Polyvinyl Ester Polymer (B)]

(1) Measurement of the degree of polymerization:
 According to JIS-K6726.

(2) Measurement of the degree of hydrolysis:
 According to JIS-K6726.

(3) Measurement of 1,2-glycol bonds:
 Like in the above, the sample to be analyzed is subjected to 500 MHz proton NMR (in JEOL GX-500) at 80° C.

(4) Block character of residual acetic acid group:
 The block character is obtained from the methylene region peak in $^{13}$C-NMR, according to the method described in Poval (published by the Polymer Publishing in 1984) and in Macromolecules, 10, 532 (1977).

(5) Methanol soluble content:
 10 g of the PVA polymer to be analyzed, 200 ml of methanol and 0.05 ml of acetic acid are put into a separable flask equipped with a condenser tube, and dissolved with stirring at 50° C. for 2 hours. The resulting solution is filtered through a filter cloth into a 500-ml mess-flask. The deposit adhering to the separable flask is washed off with methanol, and filtered into the mess-flask. The mess-flask with the filtrate therein is cooled at 20° C. Methanol is added thereto to make just 500 ml. Then, the filtrate is well stirred, and 50 ml of it is sampled. This is dried at 100° C. or higher until it has a constant weight, which is then metered. This is referred to as A (g). According to the following equation, the methanol soluble content of the sample analyzed is obtained. In case where the sample has absorbed water, the value obtained is corrected in consideration of the water content of the sample.

Methanol Soluble Content=[(A(g)×500/50)]/weight of the sample, 10(g)]×100

(6) Residual sodium acetate content:
 Measured through isotachophoresis.

(Evaluation of vinyl chloride polymerization and properties of the resulting vinyl chloride polymer)

(7) Plasticizer absorption:
 400 g of a sample of the vinyl chloride polymer powder obtained is put into a planetary mixer connected to a plasticizer absorption plastograph, and pre-heated for 4 minutes up to 88° C. with stirring at 60 rpm. 200 g of dioctyl phthalate is added thereto, and the time taken from the addition to the torque depression is read. This indicates the plasticizer absorption (min) of the sample tested. The shorter time means that the polymer is more porous and absorbs the plasticizer more rapidly.

(8) CPA (cold plasticizer absorption):
 The dioctyl phthalate absorption of the sample at 23° C. is measured according to the method of ASTM-D3367-75. The larger value means that the plasticizer absorption of the sample is larger.

(9) Bulk density:

Measured according to JIS-K6721. Samples having a larger bulk density can be extruded more smoothly, and their extrusion can be enlarged.

(10) Particle size distribution:

A sample of the polymer to be analyzed is sieved through a JIS standard 42-mesh screen, and the residue remaining on the screen is measured and expressed in terms of % by weight. The smaller value means that the amount of coarse grains in the sample analyzed is smaller and the sample has a narrower particle size distribution.

(11) Heat resistance of vinyl chloride polymer (yellowing resistance):

100 parts of a sample of vinyl chloride polymer to be tested, 2.5 parts of dibutyl tin maleate, and 40 parts of a plasticizer, dioctyl phthalate are mixed and kneaded with an open roll at 170° C., and formed into a sheet having a thickness of about 1 mm. The sheet is macroscopically checked as to whether it has yellowed or not, and the sample is evaluated according to the following criteria.

○: not almost yellowed.
Δ: somewhat yellowed.
x: greatly yellowed.

(12) Polymerization stability:

The polymerization stability of each sample is evaluated according to the following criteria.

○: The polymer produced contains few coarse particles, and little scale deposit is seen on the polymerization reactor wall.
Δ: The polymer produced contains some coarse particles, and a little scale deposit is seen on the polymerization reactor wall.
x: Blocks are formed, and good vinylic polymer could not be obtained.

(13) Evaluation of foaming resistance:

After polymerization therein, the inside of the polymerization reactor is macroscopically checked as to whether it has foam or not, and the sample is evaluated according to the following criteria.

○○: No foam found.
○: Foam found up to the height of 62 to 65% from the bottom of the polymerization reactor.
Δ: Foam found up to the height of 66 to 70% from the bottom of the polymerization reactor.
▲: Foam found up to the height of 99 to 100% from the bottom of the polymerization reactor.
x: Foam found up to the height of 100% from the bottom of the polymerization reactor, and the reflux condenser clogged with foam.

(14) PVA polymer residue in polymerization waste water:

To 10 ml of the waste water from the suspension polymerization line, added is 10 ml of an aqueous iodine solution (this is a mixture of 150 ml of aqueous 4% solution of boric acid $H_3BO_3$, 30 ml of 1/1000 N iodine solution, and 100 ml of water). The absorbance at 680 nm of the resulting mixture is measured with an spectrophotometer. A calibration curve of a reference solution, aqueous PVA polymer solution having a known polymer concentration is prepared in the same manner. Based on the calibration curve, the residual PVA polymer concentration in the polymerization waste water is calculated.

[Production Example 1 of PVA Polymer (A)]

To a 5-liter pressure reactor equipped with a stirrer, a nitrogen inlet port and an initiator inlet port, fed were 2850 g of vinyl acetate, 150 g of methanol and 0.081 g of tartaric acid. While these were bubbled with nitrogen gas introduced thereinto at room temperature, the pressure in the reactor was increased up to 2.0 MPa, then this was kept as such for 10 minutes, and thereafter the reactor was degassed. This process was repeated three times to thereby purge the system in the reactor with nitrogen. An initiator, 2,2'-azobis(N-butyl-2-methylpropionamide) was dissolved in methanol to prepare an initiator solution having a concentration of 0.1 g/liter. This was bubbled with nitrogen gas to thereby purge it with nitrogen. Next, the polymerization reactor was heated to elevate its inner temperature up to 150° C. In this stage, the pressure in the reactor was 1.1 MPa. Next, 25.0 ml of the initiator solution was put into the reactor to start the polymerization of the monomer therein. During the polymerization, the temperature of the system was kept at 150° C., and the initiator solution of 2,2'-azobis(N-butyl-2-methylpropionamide) was continuously fed into the reactor at a rate of 26.3 ml/hr. During the polymerization, the pressure in the reactor was 1.1 MPa. After 2.5 hours, the reactor was cooled to terminate the polymerization. In this stage, the solid concentration in the reaction system was 30%. Next, methanol was intermittently put into the reactor at 30° C. under reduced pressure to remove the non-reacted vinyl acetate monomer. Thus was obtained a methanol solution of polyvinyl acetate (having a polymer concentration of 33%). Methanol was added to the resulting polyvinyl acetate solution so that the solution could have a polymer concentration of 30%. To 333 g of the thus-controlled polyvinyl acetate solution in methanol (this contained 100 g of polyvinyl acetate), added was an alkali solution (10% NaOH solution in methanol) (this corresponds to a molar ratio (MR) of 0.002 to the vinyl acetate units in the polyvinyl acetate) at 40° C., with which the polymer was hydrolyzed. About 20 minutes after the addition of the alkali, the system gelled, and this was ground in a mill. After having been thus ground, this was left as such for 1 hour to promote the hydrolysis of the polymer. Next, 1000 g of methyl acetate was added to this to neutralize the alkali remaining therein. Using a phenolphthalein indicator, the complete neutralization of the system was confirmed. Then, this was filtered, and 1000 g of methanol was added to the resulting white solid residue, PVA polymer, and left at 60° C. for 2 hours to wash the residue, PVA polymer. The washing operation was repeated two times. Then, this was centrifuged to remove the liquid, and the resulting PVA polymer was dried in a drier at 70° C. for 2 days to obtain a dry PVA polymer (A) (PA-1). The degree of hydrolysis of the thus-obtained PA-1 was 72 mol %.

On the other hand, the polyvinyl acetate solution in methanol, from which the non-reacted vinyl acetate monomer had been removed after polymerization, was hydrolyzed with the alkali at an alkali molar ratio of 0.5, and the resulting gel was ground and left at 60° C. for 5 hours to promote the hydrolysis of the polymer. Then, this was washed with methanol in a mode of Soxhlet extraction therewith continued for 3 days, and thereafter this was dried at 80° C. under reduced pressure for 3 days to obtain a pure PVA polymer. The degree of polymerization of this PVA polymer was measured according to a known method of JIS-K6726, and was 1000. The 1,2-glycol bond content of the pure PVA polymer was measured through 500 MHz proton NMR (in JEOL GX-500) in the manner as above, and was 2.5 mol %. The other detailed data of the polymer analyzed are given in Table 2-1.

[Production Examples 2, 5, 6, 9 and 10 of PVA Polymer (A)]

PA-2, 5, 6, 9 and 10 were produced in the same manner of polymerization and hydrolysis as in Production Example 1 of producing PVA polymer (A), except that the amount of the vinyl acetate monomer, methanol and the initiator was varied, that the polymerization temperature was varied, and that the molar ratio of sodium hydroxide for hydrolysis was varied. The data of the polymers analyzed are given in Table 2-1.

[Production Example 3 of PVA Polymer (A)]

The PVA polymer (A) produced in Production Example 1 was heated in air at 150° C. for 5 hours to be PA-3. Its data are given in Table 2-1.

[Production Example 4 of PVA Polymer (A)]

PA-4 was produced in the same manner as in Production Example 1 for producing PVA polymer (A), except that the washing condition after hydrolysis was varied. Its data are given in Table 2-1.

[Production Examples 7, 8 of PVA Polymer (A)]

PA-7,8 were produced in the same manner as in Production Example 3, except that a suitable amount of a polymerization-controlling agent, acetaldehyde was used, that the amount of the vinyl acetate monomer, methanol and the initiator for polymerization was varied, that the molar ratio of sodium hydroxide for hydrolysis was varied, and that the washing condition after hydrolysis was varied. The data of these polymers analyzed are given in Table 2-1.

[Production Example 11 of PVA Polymer (A)]

To a 5-liter pressure reactor equipped with a stirrer, a nitrogen inlet port and an initiator inlet port, fed were 2400 g of vinyl acetate, 600 g of methanol and 49.3 g of vinylene carbonate. While these were bubbled with nitrogen gas introduced thereinto at room temperature, the pressure in the reactor was increased up to 2.0 MPa, then this was kept as such for 10 minutes, and thereafter the reactor was degassed. This process was repeated three times to thereby purge the system in the reactor with nitrogen. An initiator, α,α'-azobisisobutyronitrile was dissolved in methanol to prepare an initiator solution having a concentration of 1.0 g/liter. This was bubbled with nitrogen gas to thereby purge it with nitrogen. Next, the polymerization reactor was heated to elevate its inner temperature up to 90° C. In this stage, the pressure in the reactor was 0.4 MPa. Next, 3.0 ml of the initiator solution was put into the reactor to start the polymerization of the monomers therein. During the polymerization, the temperature of the system was kept at 90° C., and the initiator solution of α,α'-azobisisobutyronitrile was continuously fed into the reactor at a rate of 4.9 ml/hr. During the polymerization, the pressure in the reactor was 0.4 MPa. After 4 hours, the reactor was cooled to terminate the polymerization. In this stage, the solid concentration in the reaction system was 38%. Next, methanol was intermittently put into the reactor at 30° C. under reduced pressure to remove the non-reacted vinyl acetate monomer. Thus was obtained a methanol solution of polyvinyl acetate (having a polymer concentration of 33%). Methanol was added to the resulting polyvinyl acetate solution so that the solution could have a polymer concentration of 25%. To 400 g of the thus-controlled polyvinyl acetate solution in methanol (this contained 100 g of polyvinyl acetate), added was an alkali solution (10% NaOH solution in methanol) (this corresponds to a molar ratio (MR) of 0.005 to the vinyl acetate units in the polyvinyl acetate) at 40° C., with which the polymer was hydrolyzed. About 1 minute after the addition of the alkali, the system gelled, and this was ground in a mill. After having been thus ground, this was left as such for 1 hour to promote the hydrolysis of the polymer. Next, 1000 g of methyl acetate was added to this to neutralize the alkali remaining therein. Using a phenolphthalein indicator, the complete neutralization of the system was confirmed. Then, this was filtered, and 1000 g of methanol was added to the resulting white solid residue, PVA, and left at room temperature for 3 hours to wash the residue PVA. The washing operation was repeated three times. Then, this was centrifuged to remove the liquid, and the resulting PVA polymer was dried in a drier at 70° C. for 2 days to obtain a dry PVA polymer (A) (PA-11). The thus-obtained PA-11 had a degree of hydrolysis of 80 mol %.

On the other hand, the polyvinyl acetate solution in methanol, from which the non-reacted vinyl acetate monomer had been removed after polymerization, was hydrolyzed with the alkali at an alkali molar ratio of 0.5, and the resulting gel was ground and left at 60° C. for 5 hours to promote the hydrolysis of the polymer. Then, this was washed with methanol in a mode of Soxhlet extraction therewith continued for 3 days, and thereafter this was dried at 80° C. under reduced pressure for 3 days to obtain a pure PVA polymer. The degree of polymerization of this PVA polymer was measured according to a known method of JIS-K6726, and was 1200. The 1,2-glycol bond content of the pure PVA polymer was measured through 500 MHz proton NMR (in JEOL GX-500) in the manner as above, and was 2.5 mol %. The detailed data of the polymer analyzed are given in Table 2-1 along with those of the other polymers.

TABLE 2-1

| | Sample | Polymerization Temperature ° C. | Viscosity-average Degree of Polymerization | Degree of Hydrolysis mol % | 1,2-Glycol Bond Content mol % | Block Character | Methanol Soluble Content wt. % | Residual Sodium Acetate Content wt. % |
|---|---|---|---|---|---|---|---|---|
| Production Example 1 | PA-1 | 150 | 1000 | 72 | 2.5 | 0.42 | 3.1 | 0.23 |
| Production Example 2 | PA-2 | 60 | 1000 | 72 | 1.6 | 0.41 | 2.0 | 0.20 |
| Production Example 3 | PA-3 | 150 | 1000 | 72 | 2.5 | 0.51 | 3.0 | 0.23 |
| Production Example 4 | PA-4 | 150 | 1000 | 72 | 2.5 | 0.42 | 10.0 | 1.00 |

TABLE 2-1-continued

| Sample | | Polymerization Temperature ° C. | Viscosity-average Degree of Polymerization | Degree of Hydrolysis mol % | 1,2-Glycol Bond Content mol % | Block Character | Methanol Soluble Content wt. % | Residual Sodium Acetate Content wt. % |
|---|---|---|---|---|---|---|---|---|
| Production Example 5 | PA-5 | 150 | 700 | 72 | 2.5 | 0.41 | 5.4 | 0.80 |
| Production Example 6 | PA-6 | 60 | 700 | 72 | 1.6 | 0.40 | 4.8 | 0.78 |
| Production Example 7 | PA-7 | 150 | 700 | 70 | 2.5 | 0.50 | 22.0 | 1.50 |
| Production Example 8 | PA-8 | 150 | 700 | 70 | 2.5 | 0.47 | 31.0 | 2.00 |
| Production Example 9 | PA-9 | 120 | 1700 | 80 | 2.2 | 0.43 | 1.5 | 0.60 |
| Production Example 10 | PA-10 | 60 | 1700 | 80 | 1.6 | 0.42 | 1.4 | 0.55 |
| Production Example 11 | PA-11 | 90 | 1200 | 80 | 2.5 | 0.43 | 2.5 | 0.40 |

[Production Examples 12 to 14 of Polyvinyl Ester Polymer (B)]

PB-1 to PB-3 were produced in the same manner of polymerization and hydrolysis followed by solvent removal by drying as in Production Example 1 of producing PVA polymer (A), except that the amount of the vinyl acetate monomer, methanol and the initiator was varied, that the polymerization temperature was varied, and that the molar ratio of sodium hydroxide for hydrolysis was varied. The data of the polymers analyzed are given in Table 2-2.

[Production Example 15 of Polyvinyl Ester Polymer (B)]

PB-4 was produced in the same manner of polymerization and hydrolysis followed by solvent removal by drying as in Production Example 1 of producing PVA polymer (A), except that 3-mercaptopropionic acid was used in polymerization, that the amount of the vinyl acetate monomer, methanol and the initiator was varied, that the polymerization temperature was varied, and that the molar ratio of sodium hydroxide for hydrolysis was varied. The data of the polymer analyzed are given in Table 2-2.

EXAMPLES 2-1 TO 2-7

Comparative Examples 2-1 to 2-3

40 parts of deionized water with the dispersant (see Table 2-3) dissolved therein, and 0.04 parts of a 70% solution of diisopropyl peroxydicarbonate in toluene were put into a glass-lined autoclave, which was then degassed for oxygen removal to have a reduced pressure of 0.0067 MPa. Next, 30 parts of a monomer, vinyl chloride was fed into the autoclave and polymerized with stirring at a temperature of 57° C. At the start of the polymerization, the pressure in the autoclave was 0.83 MPa, and 7 hours after that, it lowered to 0.44 MPa. In this stage, the polymerization was terminated, and the non-reacted vinyl chloride monomer was purged away. The contents of the autoclave were taken out, washed with water, dewatered, and then dried. The polymerization yield of the vinyl chloride polymer thus produced was 87%, and the mean degree of polymerization of the polymer was 1050. The characteristics of the vinyl chloride polymer produced herein were analyzed and shown in Table 2-3. In Comparative Example 2-3, blocks were formed, and a good vinyl chloride polymer could not be produced.

TABLE 2-2

| Sample | | Polymerization Temperature ° C. | Viscosity-average Degree of Polymerization | Degree of Hydrolysis mol % | 1,2-Glycol Bond Content mol % | Block Character | Residual Sodium Acetate Content wt. % | Modifying Group |
|---|---|---|---|---|---|---|---|---|
| Production Example 12 | PB-1 | 150 | 250 | 30 | 2.5 | 0.51 | 0.5 | |
| Producton Example 13 | PB-2 | 60 | 250 | 30 | 1.6 | 0.50 | 0.5 | |
| Production Example 14 | PB-3 | 60 | 500 | 40 | 1.6 | 0.53 | 0.8 | |
| Production Example 15 | PB-4 | 60 | 300 | 35 | 1.6 | 0.52 | 0.6 | semi-terminating carboxyl group |

TABLE 2-3

| | Dispersant | | Evaluation of Polymerization Process | | PVA Concentration in Waste Water (ppm) | Evaluation of Properties of Vinyl Chloride Polymer | | | | |
|---|---|---|---|---|---|---|---|---|---|---|
| | | | | | | Particle Size | | Plasticizer | | |
| | PVA Polymer(A) | Amount[1] | Polymerization Stability | Foaming Resistance | | Distribution (%) | CPA (%) | Absorption Time (min) | Bulk Density (g/cc) | Heat Resistance |
| Example 2-1 | PA-1 | 0.08 | ○ | ○○ | 2.1 | 0 | 27 | 3.4 | 0.501 | ○ |
| Example 2-2 | PA-1 | 0.06 | ○ | ○○ | 1.2 | 1 | 28 | 3.3 | 0.514 | ○ |
| Example 2-3 | PA-1 | 0.04 | ○ | ○○ | 0.5 | 2 | 29 | 3.0 | 0.562 | ○ |
| Example 2-4 | PA-3 | 0.08 | ○ | ○○ | 2.2 | 0 | 26 | 3.6 | 0.515 | ○ |
| Example 2-5 | PA-4 | 0.06 | ○ | ○○ | 1.0 | 1 | 28 | 3.2 | 0.511 | ○ |
| Example 2-6 | PA-7 | 0.06 | ○ | ○○ | 1.0 | 0 | 29 | 3.1 | 0.500 | ○ |
| Example 2-7 | PA-8 | 0.06 | ○ | ○○ | 0.9 | 0 | 31 | 2.7 | 0.498 | ○ |
| Comparative Example 2-1 | PA-2 | 0.08 | Δ | ○○ | 2.5 | 2 | 24 | 4.2 | 0.501 | Δ |
| Comparative Example 2-2 | PA-2 | 0.06 | Δ | ○○ | 1.4 | 6 | 27 | 3.5 | 0.467 | Δ |
| Comparative Example 2-3 | PA-2 | 0.04 | x | — | — | — | — | — | — | — |

[1] parts by weight of (A) relative to 100 parts by weight of the vinyl chloride monomer.

EXAMPLES 2-8 TO 2-15

Comparative Examples 2-4 to 2-7

One part of deionized water with the dispersant (see Table 2-4) dissolved therein, and 0.04 parts of a 70% solution of diisopropyl peroxydicarbonate in toluene were put into a glass-lined autoclave equipped with a reflux condenser, and the autoclave was then degassed for oxygen removal to have a reduced pressure of 50 mmHg. Next, 39 parts of hot water at 85° C. and 30 parts of a monomer, vinyl chloride were fed into the autoclave both at a time with stirring. With that, the liquid level in the autoclave was at a height of 60% from the bottom, and the inner temperature was 57° C. With the inner temperature kept at 57° C., the monomer was kept polymerized. At the start of the polymerization, the inner pressure was 0.73 MPa; and 6 hours after that, it lowered to 0.42 MPa. In this stage, the polymerization was terminated, and the non-reacted vinyl chloride monomer was purged away.

The contents of the autoclave were taken out, washed with water, dewatered, and then dried. The polymerization yield of the vinyl chloride polymer thus produced was 85%, and the mean degree of polymerization of the polymer was 1050. The monomer polymerization to give the vinyl chloride polymer and the characteristics of the vinyl chloride polymer produced were evaluated and analyzed, and shown in Table 2-4.

TABLE 2-4

| | Dispersant | | | | Evaluation of Polymerization Process | | Evaluation of Properties of Vinyl Chloride Polymer | | | |
|---|---|---|---|---|---|---|---|---|---|---|
| | | | | | | | Particle Size | | Plasticizer | Bulk |
| | PVA Polymer(A) | Polyvinyl Ester Polymer (B) | Blend Ratio (A)/(B) | Total of (A) and (B)[1] | Polymerization Stability | Foaming Resistance | Distribution (%) | CPA (%) | Absorption Time (min) | Density (g/cc) |
| Example 2-8 | PA-5 | — | 100/0 | 0.1 | ○ | ○○ | 0 | 24 | 4.1 | 0.512 |
| Example 2-9 | PA-9 | — | 100/0 | 0.1 | ○ | ○○ | 0 | 17 | 10.5 | 0.528 |
| Example 2-10 | PA-11 | — | 100/0 | 0.1 | ○ | ○○ | 0 | 22 | 4.4 | 0.519 |
| Comparative Example 2-4 | PA-6 | — | 100/0 | 0.1 | Δ | ▲ | 1 | 22 | 4.5 | 0.492 |
| Comparative Example 2-5 | PA-10 | — | 100/0 | 0.1 | Δ | ▲ | 2 | 16 | 10.8 | 0.51 |
| Example 2-11 | PA-5 | PB-1 | 70/30 | 0.12 | ○ | ○○ | 0 | 31 | 3.0 | 0.501 |
| Example 2-12 | PA-5 | PB-3 | 70/30 | 0.12 | ○ | ○○ | 0 | 30 | 3.2 | 0.509 |
| Example 2-13 | PA-5 | PB-4 | 70/30 | 0.12 | ○ | ○○ | 0 | 30 | 3.2 | 0.498 |
| Example 2-14 | PA-5 | PB-1 | 70/30 | 0.08 | ○ | ○○ | 0 | 32 | 2.9 | 0.505 |
| Example 2-15 | PA-5 | PB-2 | 70/30 | 0.08 | Δ | ○○ | 1 | 31 | 3.1 | 0.507 |
| Comparative Example 2-6 | PA-6 | PB-2 | 70/30 | 0.12 | Δ | x | 3 | 27 | 3.4 | 0.488 |
| Comparative Example 2-7 | PA-10 | PB-3 | 70/30 | 0.12 | Δ | x | 3 | 18 | 7.5 | 0.503 |

[1] parts by weight of the total of (A) and (B) relative to 100 parts by weight of the vinyl chloride monomer.

Compared with conventional dispersants, the dispersant for suspension polymerization of the second aspect of the invention mentioned above ensures more stable polymerization even when its amount used is small. Therefore, vinyl chloride polymers produced in the presence of the dispersant of the invention are resistant to heat and are yellowed little. In addition, the PVA polymer remaining in the polymerization waste water is small, which therefore pollutes little the environment. Moreover, the dispersant does not foam the polymerization system in a reactor, and therefore has the other advantages of increasing the effective volume of reactors and increasing the productivity of polymers. In suspension polymerization in reflux condenser-equipped reactors, in suspension polymerization according to a hot-charge process and in suspension polymerization according to a hot-charge process of using reflux condenser-equipped reactors, the dispersant enables easy temperature control of reactors.

Combining the PVA polymer (A) and the polyvinyl ester polymer (B) for the dispersant for suspension polymerization brings about further advantages, in addition to the advantages mentioned above, in that the vinyl polymer particles obtained in the presence of the dispersant are more porous and absorb a plasticizer more rapidly, and are therefore of great value for industrial applications.

Industrial Applicability

According to the invention, provided is a polyvinyl alcohol serving as a dispersant for polymerization. This ensures good polymerization stability even when its amount used is reduced; the aqueous emulsion comprising the polyvinyl alcohol is resistant to water and the viscosity of the aqueous emulsion depends little on ambient temperatures; the vinylic polymers obtained through suspension polymerization in the presence of the polyvinyl alcohol dispersant are yellowed little; and the waste water in the suspension polymerization pollutes little the environment.

What is claimed is:

1. An aqueous emulsion which comprises, as the dispersoid, a polymer that contains vinyl ester monomer units, and, as the dispersant, a polyvinyl alcohol that contains at least 1.9 mol % of 1,2-glycol bonds, and of which the viscosity profile is such that the ratio of $T_{0°C.}/T_{30°C.}$ is at most 1.5 with $T_{60°C.}$ indicating the viscosity of the aqueous emulsion at 60° C., $T_{30°C.}$ indicating the viscosity thereof at 30° C. and $T_{0°C.}$ indicating the viscosity thereof at 0° C., by using a B-type viscometer at 20 rpm.

2. The aqueous emulsion as claimed in claim 1, wherein the polymer that contains vinyl ester monomer units is a polyvinyl ester.

3. The aqueous emulsion as claimed in claim 1, wherein the polymer that contains vinyl ester monomer units is an ethylene-vinyl ester copolymer.

4. A method for producing an aqueous emulsion, of which the viscosity profile is such that the ratio of $T_{0°C.}/T_{30°C.}$ is at most 1.5 with $T_{60°C.}$ indicating the of viscosity the aqueous emulsion at 60° C., $T_{30°C.}$ indicating the viscosity thereof at 30° C. and $T_{0°C.}$ indicating the viscosity thereof at 0° C., by using a B-type viscometer at 20 rpm which comprises polymerizing a vinyl ester monomer through emulsion polymerization in the presence of (1) a polyvinyl alcohol that contains t least 1.9 mol % of 1,2-glycol bonds and serves as a dispersant, and (2) at least one polymerization initiator selected from hydrogen peroxide, ammonium persulfate and potassium persulfate in a molar ratio to the vinyl ester monomer of from 0.001 to 0.03, in such a polymerization mode that (3) from 5 to 20% by weight of the vinyl ester monomer, based on the total amount of the monomers, is fed into the reactor int he initial stage of polymerization and the polymerization initiator is fed thereinto all at a time in a molar ratio to the initial feed of the vinyl ester monomer of from 0.001 to 0.05.

5. A dispersant for suspension polymerization of vinylic compounds, which comprises a polyvinyl alcohol (A) having at least 1.9 mol % of 1,2-glycol bonds.

6. The dispersant for suspension polymerization of vinylic compounds as claimed in claim 5, wherein the polyvinyl alcohol (A) has a viscosity-average degree of polymerization of from 100 to 4000.

7. A dispersant for suspension polymerization of vinylic compounds which comprises a polyvinyl alcohol (A) having at least 1.9 mol % of 1,2-glycol bond, wherein the polyvinyl alcohol (A) has a block character of the residual acetic acid group of from 0.35 to 0.8.

8. A dispersant for suspension polymerization of vinylic compounds which comprises a polyvinyl alcohol (A) having at least 1.9 mol % of 1,2-glycol bond, wherein the polyvinyl alcohol (A) has a methanol soluble content of from 0.05 to 40% by weight.

9. A dispersant for suspension polymerization of vinylic compounds, which comprises the polyvinyl alcohol (A) of claim 5 and a polyvinyl ester polymer (B) having a degree of hydrolysis of smaller than 60 mol %, in a ratio by weight of the component (A) to the component (B), (A)/(B) falling between 40/60 and 95/5.

10. The dispersant for suspension polymerization of vinylic compounds as claimed in claim 5, wherein the vinylic compound contains vinyl chloride.

11. A method for suspension polymerization of the vinylic compounds comprising polymerizing a vinylic compound in the presence of a dispersant comprising a polyvinyl alcohol that contains at least 1.9 mol % of 1,2-glycol bonds.

12. The aqueous emulsion of claim 1, wherein said polyvinyl alcohol contains at least 1.95 mol % of 1,2-glycol bonds.

13. The aqueous emulsion of claim 1, wherein said polyvinyl alcohol contains at least 2.0 mol % of 1,2-glycol bonds.

14. The aqueous emulsion of claim 1, wherein said polyvinyl alcohol contains at least 2.1 mol % of 1,2-glycol bonds.

15. The aqueous emulsion of claim 1, wherein said polyvinyl alcohol contains at most 4 mol % of 1,2-glycol bonds.

16. The aqueous emulsion of claim 1, wherein said polyvinyl alcohol contains at most 3.2 mol % of 1,2-glycol bonds.

17. The aqueous emulsion of claim 1, wherein $T_{0°C.}/T_{30°C.}$ is at most 4.

18. The aqueous emulsion of claim 1, wherein $T_{0°C.}/T_{30°C.}$ is at most 3.

19. The aqueous emulsion of claim 1, wherein $T_{60°C.}/T_{30°C.}$ is at most 1.3.

20. The aqueous emulsion of claim 1, wherein $T_{60°C.}/T_{30°C.}$ is at most 1.2.

21. A method of suspension polymerization of vinylic compounds, which comprises carrying out the polymerization of vinylic compounds between 30–80° C. using polyvinyl alcohol containing at least 1.9 mol % of 1,2-glycol bonds as the dispersant, wherein the amount of the dispersant is 0.01 to 5 parts by weight based on 100 parts by weight of the vinylic compounds.

* * * * *

UNITED STATES PATENT AND TRADEMARK OFFICE
CERTIFICATE OF CORRECTION

PATENT NO. : 6,495,623 B1
DATED : December 17, 2002
INVENTOR(S) : Seiji Tanimoto et al.

It is certified that error appears in the above-identified patent and that said Letters Patent is hereby corrected as shown below:

Column 37,
Lines 34 and 47, insert -- 5 and the ratio of $T_{60°C}/T_{30°C}$ is at most -- after "most".
Line 55, replace "t", with -- at --.
Line 63, replace "in the" with -- in the --.

Signed and Sealed this

Twenty-third Day of September, 2003

JAMES E. ROGAN
*Director of the United States Patent and Trademark Office*